US011691196B2

(12) United States Patent
Sheinman et al.

(10) Patent No.: US 11,691,196 B2
(45) Date of Patent: *Jul. 4, 2023

(54) METHOD AND APPARATUS FOR ADDITIVE MANUFACTURING WITH POWDER MATERIAL

(71) Applicant: Stratasys Ltd., Rehovot (IL)

(72) Inventors: Yehoshua Sheinman, RaAnana (IL); Shai Hirsch, Rehovot (IL); Almog Shahar, Kibbutz Beit-Kama (IL); Uri Grach, MaAle Adumim (IL); Kirill Tanhilevich, Holon (IL)

(73) Assignee: Stratasys Ltd., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,130

(22) Filed: Jun. 7, 2021

(65) Prior Publication Data

US 2021/0291273 A1 Sep. 23, 2021

Related U.S. Application Data

(63) Continuation of application No. 16/381,042, filed on Apr. 11, 2019, now Pat. No. 11,059,100, which is a (Continued)

(51) Int. Cl.
*B22F 3/02* (2006.01)
*B33Y 10/00* (2015.01)
(Continued)

(52) U.S. Cl.
CPC ............ *B22F 3/02* (2013.01); *B22F 10/14* (2021.01); *B22F 10/50* (2021.01); *B22F 10/73* (2021.01);
(Continued)

(58) Field of Classification Search
None
See application file for complete search history.

(56) References Cited

U.S. PATENT DOCUMENTS

| 4,247,508 A | 1/1981 | Housholder |
| 4,806,985 A | 2/1989 | Foley et al. |
| (Continued) | | |

FOREIGN PATENT DOCUMENTS

| CN | 1496769 | 11/1999 |
| CN | 1671503 | 9/2005 |
| (Continued) | | |

OTHER PUBLICATIONS

Advisory Action dated Apr. 1, 2020 from Re. U.S. Appl. No. 16/092,770. (2 pages).

(Continued)

*Primary Examiner* — Yung-Sheng M Tsui

(57) ABSTRACT

A system for building a three dimensional green compact comprising a printing station configured to print a mask pattern on a building surface, wherein the mask pattern is formed of solidifiable material; a powder delivery station configured to apply a layer of powder material on the mask pattern; a die compaction station for compacting the layer formed by the powder material and the mask pattern; and a stage configured to repeatedly advance a building tray to each of the printing station, the powder delivery station and the die compaction station to build a plurality of layers that together form the three dimensional green compact.

20 Claims, 14 Drawing Sheets

Related U.S. Application Data continuation of application No. 16/092,770, filed as application No. PCT/IL2017/050439 on Apr. 9, 2017, now Pat. No. 10,730,109.

(60) Provisional application No. 62/473,605, filed on Mar. 20, 2017, provisional application No. 62/320,655, filed on Apr. 11, 2016.

(51) Int. Cl.

| | | |
|---|---|---|
| *B33Y 30/00* | (2015.01) | |
| *C22C 1/04* | (2023.01) | |
| *B33Y 40/20* | (2020.01) | |
| *B22F 10/14* | (2021.01) | |
| *B22F 10/73* | (2021.01) | |
| *B22F 12/52* | (2021.01) | |
| *B22F 12/53* | (2021.01) | |
| *B22F 12/55* | (2021.01) | |
| *B22F 12/57* | (2021.01) | |
| *B22F 12/58* | (2021.01) | |
| *B22F 12/63* | (2021.01) | |
| *B22F 12/86* | (2021.01) | |
| *B22F 10/50* | (2021.01) | |
| *B33Y 40/00* | (2020.01) | |
| *B33Y 70/00* | (2020.01) | |
| *B29C 64/357* | (2017.01) | |
| *B29C 64/165* | (2017.01) | |
| *B29C 64/218* | (2017.01) | |
| *B22F 12/10* | (2021.01) | |
| *B29K 505/02* | (2006.01) | |

(52) U.S. Cl.
CPC .............. *B22F 12/52* (2021.01); *B22F 12/53* (2021.01); *B22F 12/55* (2021.01); *B22F 12/57* (2021.01); *B22F 12/58* (2021.01); *B22F 12/63* (2021.01); *B22F 12/86* (2021.01); *B29C 64/165* (2017.08); *B29C 64/218* (2017.08); *B29C 64/357* (2017.08); *B33Y 10/00* (2014.12); *B33Y 30/00* (2014.12); *B33Y 40/00* (2014.12); *B33Y 40/20* (2020.01); *B33Y 70/00* (2014.12); *C22C 1/0416* (2013.01); *B22F 12/10* (2021.01); *B22F 2301/052* (2013.01); *B29K 2505/02* (2013.01); *Y02P 10/20* (2015.11); *Y02P 10/25* (2015.11)

(56) References Cited

U.S. PATENT DOCUMENTS

| | | |
|---|---|---|
| 4,992,236 A | 2/1991 | Shira |
| 5,076,869 A | 12/1991 | Bourell et al. |
| 5,139,338 A | 8/1992 | Pomerantz et al. |
| 5,154,881 A | 10/1992 | Rutz et al. |
| 5,204,055 A | 4/1993 | Sachs et al. |
| 5,263,130 A | 11/1993 | Pomerantz et al. |
| 5,287,435 A | 2/1994 | Cohen |
| 5,354,414 A | 10/1994 | Feygin |
| 5,387,380 A | 2/1995 | Cima et al. |
| 5,519,816 A | 5/1996 | Pomerantz et al. |
| 5,555,481 A | 9/1996 | Rock et al. |
| 5,637,175 A | 6/1997 | Feygin et al. |
| 5,649,277 A | 7/1997 | Greul et al. |
| 5,695,708 A | 12/1997 | Karp et al. |
| 5,744,433 A | 4/1998 | Storstrom et al. |
| 5,902,537 A | 5/1999 | Almquist et al. |
| 5,937,265 A | 8/1999 | Pratt et al. |
| 6,036,777 A | 3/2000 | Sachs |
| 6,147,138 A | 11/2000 | Hochsmann |
| 6,193,923 B1 | 2/2001 | Leyden et al. |
| 6,589,471 B1 | 7/2003 | Khoshnevis |
| 7,141,207 B2 | 11/2006 | Jandeska, Jr. et al. |
| 7,148,840 B2 | 12/2006 | Dooi |
| 7,460,984 B1 | 12/2008 | Clark et al. |
| 7,896,639 B2 | 3/2011 | Kritchman et al. |
| 8,119,053 B1 | 2/2012 | Bedal et al. |
| 8,682,395 B2 | 3/2014 | Muhammad |
| 8,810,537 B2 | 8/2014 | Yousefpor et al. |
| 8,907,929 B2 | 12/2014 | Li et al. |
| 9,573,323 B2 | 2/2017 | Heide |
| 10,730,109 B2 | 8/2020 | Sheinman et al. |
| 2003/0063138 A1 | 4/2003 | Varnon et al. |
| 2004/0018107 A1 | 1/2004 | Khoshnevis |
| 2004/0045637 A1 | 3/2004 | Tanaka et al. |
| 2004/0146650 A1 | 7/2004 | Lockard et al. |
| 2004/0224173 A1 | 11/2004 | Boyd et al. |
| 2006/0166159 A1 | 7/2006 | Abels et al. |
| 2006/0246222 A1 | 11/2006 | Winkler |
| 2007/0241482 A1 | 10/2007 | Giller et al. |
| 2008/0111271 A1 | 5/2008 | Khoshnevis |
| 2009/0255912 A1* | 10/2009 | Dietrich ................ B29C 64/25 425/174 |
| 2010/0321325 A1 | 12/2010 | Springer et al. |
| 2011/0241947 A1 | 10/2011 | Scott et al. |
| 2012/0187611 A1 | 7/2012 | Larsson et al. |
| 2013/0186514 A1 | 7/2013 | Zhuang et al. |
| 2013/0186558 A1 | 7/2013 | Comb et al. |
| 2013/0241113 A1 | 9/2013 | Geers et al. |
| 2013/0297059 A1 | 11/2013 | Griffith et al. |
| 2014/0110872 A1 | 4/2014 | Levy et al. |
| 2014/0134962 A1 | 5/2014 | Huynh et al. |
| 2014/0170012 A1 | 6/2014 | Delisle et al. |
| 2014/0324204 A1 | 10/2014 | Vidimce et al. |
| 2015/0273769 A1 | 10/2015 | Korn |
| 2015/0301651 A1 | 10/2015 | Leigh et al. |
| 2015/0324029 A1 | 11/2015 | Bakken et al. |
| 2016/0107383 A1 | 4/2016 | Dikovsky et al. |
| 2016/0114427 A1 | 4/2016 | Eibl et al. |
| 2016/0158843 A1 | 6/2016 | Yolton et al. |
| 2016/0158889 A1 | 6/2016 | Carter et al. |
| 2016/0193696 A1* | 7/2016 | Mcfarland ............ B23K 26/32 219/76.12 |
| 2016/0195943 A1 | 7/2016 | Gur et al. |
| 2016/0200908 A1 | 7/2016 | Osaka et al. |
| 2017/0072636 A1 | 3/2017 | Ng et al. |
| 2017/0129180 A1 | 5/2017 | Coates |
| 2017/0173696 A1 | 6/2017 | Sheinman |
| 2017/0176979 A1 | 6/2017 | Lalish et al. |
| 2017/0239719 A1 | 8/2017 | Buller et al. |
| 2017/0240472 A1 | 8/2017 | Blacker et al. |
| 2017/0253004 A1 | 9/2017 | Pereira Mosqueira et al. |
| 2017/0278586 A1 | 9/2017 | Van Staden et al. |
| 2017/0297322 A1* | 10/2017 | Liao ..................... B33Y 40/00 |
| 2017/0305067 A1 | 10/2017 | Cortes et al. |
| 2018/0036801 A1 | 2/2018 | Ishihara et al. |
| 2018/0103728 A1 | 4/2018 | Koo |
| 2018/0104793 A1 | 4/2018 | Franke et al. |
| 2018/0111319 A1* | 4/2018 | Brezoczky ........... B29C 64/255 |
| 2018/0133955 A1* | 5/2018 | Gibson ................. A61L 27/46 |
| 2018/0297284 A1 | 10/2018 | Fulop et al. |
| 2019/0134705 A1 | 5/2019 | Sheinman et al. |
| 2019/0232367 A1 | 8/2019 | Sheinman et al. |
| 2020/0016656 A1 | 1/2020 | Sheinman et al. |
| 2020/0070246 A1 | 3/2020 | Sheinman et al. |
| 2022/0049331 A1 | 2/2022 | Valls Anglés |

FOREIGN PATENT DOCUMENTS

| | | |
|---|---|---|
| CN | 100336655 | 9/2007 |
| CN | 100406169 | 7/2008 |
| CN | 101516552 | 8/2009 |
| CN | 102189261 | 9/2011 |
| CN | 203109234 | 8/2013 |
| CN | 103801696 | 5/2014 |
| CN | 104628393 | 5/2014 |
| CN | 103842157 | 6/2014 |
| CN | 104536625 | 4/2015 |
| CN | 104907567 | 9/2015 |
| CN | 104968500 | 10/2015 |
| CN | 105408095 | 3/2016 |
| CN | 106077651 | 11/2016 |

(56) References Cited

FOREIGN PATENT DOCUMENTS

| | | |
|---|---|---|
| CN | 106488820 | 3/2017 |
| DE | 10344901 | 5/2004 |
| DE | 102009029765 | 12/2010 |
| DE | 102013011676 | 1/2015 |
| EP | 0250121 | 12/1987 |
| EP | 0500225 | 8/1992 |
| EP | 2728449 | 5/2014 |
| EP | 2747193 | 6/2014 |
| JP | 60-2000901 | 10/1985 |
| JP | 06-179243 | 6/1994 |
| JP | 07-88726 | 4/1995 |
| JP | 2005-533927 | 11/2005 |
| JP | 2015-196265 | 11/2015 |
| JP | 2015-202683 | 11/2015 |
| JP | 2016-078097 | 5/2016 |
| TW | 201331026 | 8/2013 |
| WO | WO 98/28124 | 7/1998 |
| WO | WO 2004/009281 | 1/2004 |
| WO | WO 2004/058487 | 7/2004 |
| WO | WO 2013/021173 | 2/2013 |
| WO | WO 2014/068579 | 5/2014 |
| WO | WO 2015/025171 | 2/2015 |
| WO | WO 2015/170330 | 11/2015 |
| WO | WO-2015170330 A1 * 11/2015 ............. B22F 10/00 |
| WO | WO 2016/176432 | 11/2016 |
| WO | WO 2017/179052 | 10/2017 |
| WO | WO 2017/179052 A8 | 10/2017 |
| WO | WO 2018/118009 | 6/2018 |
| WO | WO 2018/173048 | 9/2018 |
| WO | WO 2018/173050 | 9/2018 |
| WO | WO 2016/147448 | 9/2019 |
| WO | WO 2020/129054 | 6/2020 |

OTHER PUBLICATIONS

Communication Pursuant to Article 94(3) EPC dated Jun. 5, 2019 From the European Patent Office Re. Application No. 17723527.2. (7 Pages).
Communication Pursuant to Article 94(3) EPC dated Sep. 11, 2020 From the European Patent Office Re. Application No. 18720380.7. (7 Pages).
Communication Pursuant to Article 94(3) EPC dated Sep. 11, 2020 From the European Patent Office Re. Application No. 18722739.2. (6 Pages).
Communication Pursuant to Article 94(3) EPC dated Apr. 28, 2020 From the European Patent Office Re. Application No. 19172027.5. (7 Pages).
Corrected Written Opinion dated May 25, 2020 From the International Searching Authority Re. Application No. PCT/IL2019/051374. (5 Pages).
European Search Report and the European Search Opinion dated Jul. 4, 2019 From the European Patent Office Re. Application No. 19172027.5. (16 Pages).
European Search Report and the European Search Opinion dated May 25, 2021 From the European Patent Office Re. Application No. 21156079.2. (12 Pages).
Examination Report Under Sections 12 & 13 of the Patents Act, 1970 and the Patents Rules, 2003 dated Mar. 5, 2021From the Government of India, Intellectual Property India, Patents, Designs, Trade Marks, Geographical Indications, The Patent Office Re. Application No. 201827040181. (8 Pages).
Final Official Action dated Sep. 25, 2020 from Re. U.S. Appl. No. 16/381,042. (28 pages).
Final Official Action dated Jul. 8, 2020 from Re. U.S. Appl. No. 15/304,873. (31 pages).
Grounds of Reasons for Rejection dated Mar. 29, 2021 From the Korean Intellectual Property Office Re. Application No. 10-2018-7032441 and Its Translation Into English. (5 Pages).
International Preliminary Report on Patentability dated Jun. 1, 2016 From the International Preliminary Examining Authority Re. Application No. PCT/IL2015/050478.

International Preliminary Report on Patentability dated Oct. 3, 2019 From the International Bureau of WIPO Re. Application No. PCT/IL2018/050317. (12 Pages).
International Preliminary Report on Patentability dated Oct. 3, 2019 From the International Bureau of WIPO Re. Application No. PCT/IL2018/050319. (12 Pages).
International Preliminary Report on Patentability dated Oct. 25, 2018 From the International Bureau of WIPO Re. Application No. PCT/IL2017/050439. (16 Pages).
International Search Report and the Written Opinion dated Aug. 13, 2015 From the International Searching Authority Re. Application No. PCT/IL2015/050478.
International Search Report and the Written Opinion dated Mar. 19, 2020 From the International Searching Authority Re. Application No. PCT/IL2019/051374. (14 Pages).
International Search Report and the Written Opinion dated Jul. 21, 2017 From the International Searching Authority Re. Application No. PCT/IL2017/050439. (21 Pages).
International Search Report and the Written Opinion dated Jun. 26, 2018 From the International Searching Authority Re. Application No. PCT/IL2018/050317. (17 Pages).
International Search Report and the Written Opinion dated Jun. 26, 2018 From the International Searching Authority Re. Application No. PCT/IL2018/050319. (18 Pages).
Interview Summary dated Jan. 22, 2021 from Re. U.S. Appl. No. 16/381,042. (2 pages).
Interview Summary dated Aug. 31, 2020 from Re. U.S. Appl. No. 15/304,873. (3 pages).
Notice of Allowance dated Jan. 14, 2021 from Re. U.S. Appl. No. 15/304,873. (14 pages).
Notice of Allowance dated Mar. 16, 2021 from Re. U.S. Appl. No. 16/381,042 (19 pages).
Notice of Allowance dated May 6, 2020 from Re. U.S. Appl. No. 16/092,770. (15 pages).
Notice of Reasons for Rejection dated Mar. 9, 2021 From the Japan Patent Office Re. Application No. 2018-553387 and Its Translation Into English. (4 Pages).
Notification of Office Action and Search Report dated Jun. 1, 2020 From the State Intellectual Property Office of the People's Republic of China Re. Application No. 201780031178.4. (13 Pages).
Notification of Office Action and Search Report dated Sep. 3, 2018 From the State Intellectual Property Office of the People's Republic of China Re. Application No. 201580037461.9. (5 Pages).
Notification of Office Action and Search Report dated Apr. 6, 2021 From the State Intellectual Property Office of the People's Republic of China Re. Application No. 201880023654.2 and Its Translation of Office Action Into English. (34 Pages).
Notification of Office Action and Search Report dated Mar. 26, 2021 From the State Intellectual Property Office of the People's Republic of China Re. Application No. 201880027064.7 and Its Translation of Office Action Into English. (21 Pages).
Notification of Office Action dated Feb. 2, 2021 From the State Intellectual Property Office of the People's Republic of China Re. Application No. 201780031178.4 and Its Translation Into English. (11 Pages).
Notification of Office Action dated Jan. 22, 2018 From the State Intellectual Property Office of the People's Republic of China Re. Application No. 201580037461.9 and Its Translation into English.(7 Pages).
Office Action dated Mar. 24, 2020 From the Israel Patent Office Re. Application No. 248806 and Its Translation Into English. (4 Pages).
Official Action dated Mar. 5, 2019 From Re. U.S. Appl. No. 15/304,873. (37 pages).
Official Action dated May 11, 2020 from Re. U.S. Appl. No. 16/381,042. (31 pages).
Official Action dated Oct. 11, 2019 From Re. U.S. Appl. No. 16/092,770. (39 Pages).
Official Action dated Sep. 18, 2020 from Re. U.S. Appl. No. 15/304,873. (25 pages).
Official Action dated Jan. 2, 2020 From Re. U.S. Appl. No. 16/092,770. (30 pages).
Official Action dated Oct. 29, 2019 From Re. U.S. Appl. No. 15/304,873. (28 Pages).

(56) References Cited

OTHER PUBLICATIONS

Restriction Official Action dated Nov. 6, 2018 From Re. U.S. Appl. No. 15/304,873. (9 pages).
Restriction Official Action dated Aug. 15, 2019 From Re. U.S. Appl. No. 16/092,770. (10 pages).
Restriction Official Action dated Jan. 30, 2020 From Re. U.S. Appl. No. 16/381,042. (7 pages).
Supplementary European Search Report and the European Search Opinion dated Jan. 2, 2018 From the European Patent Office Re. Application No. 15789324.9. (7 Pages).
Translation Dated Jun. 9, 2020 of Notification of Office Action dated Jun. 1, 2020 From the State Intellectual Property Office of the People's Republic of China Re. Application No. 201780031178.4. (8 Pages).
Translation Dated Sep. 17, 2018 of Notification of Office Action dated Sep. 3, 2018 From the State Intellectual Property Office of the People's Republic of China Re. Application No. 201580037461.9. (1 Page).
Han "Powder Metallurgy Machinery Parts, 1st Edition", Machinery Industry Press, p. 45-51, Dec. 1987.
Lai et al. "ExtendThumb: A Target Acquisition Approach for One-Handed Interaction With Touch-Screen Mobile Phones", IEEE Transactions on Human-Machine Systems, 45(3): 362-370, Dec. 18, 2014. Abstract.
Schulz et al. "Polyhedral Surface Approximation of Non-Convex Voxel Sets Through the Modification of Convex Hulls", Proceedings of the 12th International Workshop on Combinatorial Image Analysis, IWCIA '08. XP019087154, p. 38-50, Apr. 7, 2008.
Shuzhu "Cemented Carbide Production Principle and Quality Control", p. 204-209, Aug. 31, 2014 & English Abstract.
Zwier et al. "Design for Additive Manufacturing: Automated Build Orientation Selection and Optimization", 5th CIRP Global Web Conference Research and Innovation for Future Production, Procedia CIRP, XP055373404, 55: 128-133, Jan. 2016.
Communication Pursuant to Article 94(3) EPC dated Mar. 16, 2022 From the European Patent Office Re. Application No. 19828328.5. (5 Pages).
Notice of Allowance dated Apr. 8, 2022 together with Interview Summary dated Mar. 16, 2022 from Re. U.S. Appl. No. 16/495,407. (11 pages).
Official Action dated Mar. 30, 2022 from Re. U.S. Appl. No. 16/495,410. (91 pages).
Notice of Reasons for Rejection dated Mar. 18, 2022 From the Japan Patent Office Re. Application No. 2014-513308 together with an English Summay. (9 Pages).
Translation Dated Oct. 14, 2021 of Notification of Office Action dated Sep. 23, 2021 From the State Intellectual Property Office of the People's Republic of China Re. Application No. 201880027064. 7. (8 Pages).
Notification of Office Action dated Sep. 23, 2021 From the State Intellectual Property Office of the People's Republic of China Re. Application No. 201880027064.7. (7 Pages).
Notification of Office Action and Search Report dated Nov. 12, 2021 From the State Intellectual Property Office of the People's Republic of China Re. Application No. 201880023654.2. (16 Pages).
Examination Report dated Jul. 12, 2021 From the Servico Publico Federal, Ministerio da Economia, Institute Nacional da Propriedade Industrial do Brasil RE Application No. BR11 2018 07980 8. ( 4 Pages).
Notification of Office Action and Search Report dated Apr. 8, 2022 From the State Intellectual Property Office of the People's Republic of China Re. Application No. 201880027064.7 and Its Translation of Office Action Into English. (6 Pages).
Notification of Office Action and Search Report dated Nov. 12, 2021 From the State Intellectual Property Office of the People's Republic of China Re. Application No. 201880023654.2 together with an English Summary. (25 Pages).
International Preliminary Report on Patentability dated Jul. 1, 2021 From the International Bureau of WIPO Re. Application No. PCT/IL2019/051374. (9 Pages).
Communication Pursuant to Article 94(3) EPC dated Jun. 17, 2021 From the European Patent Office Re. Application No. 18722739.2. (8 Pages).
Communication Pursuant to Article 94(3) EPC dated Jun. 17, 2021 From the European Patent Office Re. Application No. 18720380.7 (5 Pages).
English Translation of Examination Report dated Jul. 12, 2021 From the Servico Publico Federal, Ministerio da Economia, Instituto Nacional da Propriedade Industrial do Brasil RE Application No. BR112018070980.8. (4 Pages).
Notice of Reason(s) for Rejection dated Oct. 22, 2021 From the Japan Patent Office Re. Application No. 2021-121341 and Its Translation Into English. (6 Pages).
English Translation Dated Feb. 2, 2022 of Notice of Reason(s) for Rejection dated Jan. 25, 2022 From the Japan Patent Office Re. Application No. 2019-552114. (6 Pages).
Notice of Reason(s) for Rejection dated Jan. 25, 2022 From the Japan Patent Office Re. Application No. 2019-552114. (6 Pages).
Restriction Official Action dated Jan. 12, 2022 from Re. U.S. Appl. No. 16/495,410. (9 pages).
Han et al. "Super-Resolution Electro hydrodynamic (EHD) 3D Printing of Micro-Structures Using Phase-Change Inks", Manufacturing Letters, 2(4): 96-99, Oct. 2014.
Official Action dated Dec. 10, 2021 from Re. U.S. Appl. No. 16/495,407. (77 pages).
Communication Pursuant to Article 94(3) EPC dated Sep. 14, 2022 From the European Patent Office Re. Application No. 21156079.2. (7 Pages).
Official Action dated Sep. 28, 2022 from Re. U.S. Appl. No. 16/495,410. (25 pages).
Translation Dated Jan. 17, 2023 of Notification of Office Action dated Dec. 5, 2022 From the State Intellectual Property Office of the People's Republic of China Re. Application No. 202110856441.1.(4 pages).
Office Action dated Nov. 30, 2022 From the Israel Patent Office Re. Application No. 269484. (6 Pages).
Notification of Office Action and Search Report dated Dec. 5, 2022 From the State Intellectual Property Office of the People's Republic of China Re. Application No. 202110856441.1. (7 Pages).
Official Action dated Feb. 8, 2023 from the US Patent and Trademark Office Re. U.S. Appl. No. 16/495,410. (50 pages).

\* cited by examiner

METHOD AND APPARATUS FOR ADDITIVE MANUFACTURING WITH POWDER MATERIAL

RELATED APPLICATIONS

This application is a continuation of U.S. patent application Ser. No. 16/381,042 filed on Apr. 9, 2017, which is a continuation of U.S. patent application Ser. No. 16/092,770 filed on Oct. 11, 2018, now U.S. Pat. No. 10,730,109, which is a National Phase of PCT Patent Application No. PCT/IL2017/050439 having International filing date of Apr. 9, 2017, which claims the benefit of priority under 35 USC § 119(e) of U.S. Provisional Patent Application No. 62/320,655 filed on Apr. 11, 2016 and U.S. Provisional Patent Application No. 62/473,605 filed on Mar. 20, 2017.

The contents of the above applications are all incorporated by reference as if fully set forth herein in their entirety.

FIELD AND BACKGROUND OF THE INVENTION

The present invention, in some embodiments thereof, relates to three dimensional (3D) printing with layers of powdered material and, more particularly, but not exclusively, to 3D printing of metal objects with powdered metal as the building material.

A number of different processes for fabricating solid objects by 3D printing with successive layers of powdered material are known. Some known 3D printing techniques selectively apply a liquid binder material based on a 3D model of the object, binding the material together layer by layer to create a solid structure. In some processes, the object is heated and/or sintered to further strengthen bonding of the material at the end of the building process.

Selective Laser Sintering (SLS) uses a laser as the power source to sinter layers of powdered material. The laser is controlled to aim at points in space defined by a 3D model, binding the material together layer by layer to create a solid structure. Selective laser melting (SLM) is comparable technique that applies full melting of the material instead of sintering. SLM is typically applied when the melting temperature of the powder is uniform, e.g. when pure metal powders are used as the building material.

U.S. Pat. No. 4,247,508 entitled "MOLDING PROCESS", the contents of which are incorporated herein by reference, describes a molding process for forming a 3D article in layers. In one embodiment, planar layers of material are sequentially deposited. In each layer, prior to the deposition of the next layer, a portion of its area is solidified to define that portion of the article in that layer. Selective solidification of each layer may be accomplished by using heat and a selected mask or by using a controlled heat scanning process. Instead of using a laser to selectively fuse each layer, a separate mask for each layer and a heat source may be employed. The mask is placed over its associated layer and a heat source located above the mask. Heat passing through the opening of the mask will fuse together the particles exposed through the opening of the mask. The particles not exposed to the direct heat will not be fused.

U.S. Pat. No. 5,076,869 entitled "MULTIPLE MATERIAL SYSTEMS FOR SELECTIVE BEAM SINTERING", the contents of which are incorporated herein by reference, describes a method and apparatus for selectively sintering a layer of powder to produce a part comprising a plurality of sintered layers. The apparatus includes a computer controlling a laser to direct the laser energy onto the powder to produce a sintered mass. For each cross-section, the aim of the laser beam is scanned over a layer of powder and the beam is switched on to sinter only the powder within the boundaries of the cross-section. Powder is applied and successive layers sintered until a completed part is formed. Preferably, the powder comprises a plurality of materials having different dissociation or bonding temperatures. The powder preferably comprises blended or coated materials.

International Patent Publication No. WO2015/170330 entitled "METHOD AND APPARATUS FOR 3D PRINTING BY SELECTIVE SINTERING", the contents of which are incorporated herein by reference, discloses a method for forming an object by 3D printing that includes providing a layer of powder on a building tray, performing die compaction on the layer, sintering the layer that is die compacted by selective laser sintering or selective laser melting and repeating the providing, the die compaction and the sintering per layer until the three dimensional object is completed. The selective sintering disclosed is by a mask pattern that defines a negative of a portion of the layer to be sintered.

SUMMARY OF THE INVENTION

According to an aspect of some embodiments of the present disclosure there is provided a system and method for 3D printing with powder layers. The system and method may be applied for forming a metal object with powdered metal as the building material. Optionally, other powdered materials such as plastics and ceramics may be used. According to some exemplary embodiments, a mask for each layer is first printed with a three dimensional printer that deposits solidifiable material, e.g. a photopolymer material or a phase-change ink (e.g., thermal ink) and then a layer is formed by spreading a powder layer over the mask. Typically the mask traces a pattern of solidifiable material. The object being formed from a plurality of layers is defined by the mask pattern that outlines a contour of the object with the solidifiable material and separates the object from the surrounding area, e.g. the support area.

In some exemplary embodiments, the printed metal object (also referred to as the "green body") is formed within a green compact (also referred to as a "green block") and is subsequently sintered in a furnace at the end of the layer building process. In some embodiments, the solidifiable material forming the mask pattern is burnt, liquefied or evaporated during a dedicated heating process prior to sintering, and the object is extracted from the green compact by removing the surrounding supporting regions (also referred to as support or supporting areas or sections). According to some exemplary embodiments, the mask pattern applied per layer provides dividing walls formed from the solidifiable material that divide the supporting regions surrounding the object into sections that may be easily separated from the object at the termination of the layer building process.

According to an aspect of the present invention there is provided a system for building a three dimensional green compact comprising: a printing station configured to print a mask pattern on a building surface, wherein the mask pattern is formed with a solidifiable material; a powder delivery station configured to apply a layer of powder material on the mask pattern; a die compaction station for compacting the layer of powder material and the mask pattern; and a stage configured to repeatedly advance a building tray to each of the printing station, the powder delivery station and the die compaction station to build a plurality of layers that together form the three dimensional green compact.

Optionally, the three dimensional green compact includes an object being formed and a support region.

Optionally, the solidifiable material is selected from the group consisting of a phase-change ink, a thermal ink, a photopolymer material, wax, or any combination thereof.

Optionally, the phase-change ink is a configured to substantially evaporate at a temperature of above 300° C.

Optionally, the powder material is an aluminum alloy.

Optionally, the powder delivery station comprises a powder dispensing station and a powder spreading station.

Optionally, the powder delivery station comprises: a powder hopper configured to store the powder material; a dispensing tip configured to dispense the powder material; a powder dispensing tray configured to receive the powder material from the dispensing tip; and an actuator configured to deliver the powder material on the powder dispensing tray to the building tray.

Optionally, the powder dispensing tray includes a plurality of troughs configured to receive the powder material.

Optionally, the system includes a first rail configured to advance the powder dispensing tray so that the hopper dispenses powder to each of the plurality of troughs of the powder dispensing tray.

Optionally, the actuator is configured to simultaneously flip the plurality of troughs.

Optionally, the actuator is configured to simultaneously open a longitudinal aperture located at the bottom of each of the plurality of troughs.

Optionally, the system includes a second rail configured to advance the powder dispensing tray so that the hopper dispenses powder along a trough on the powder dispensing tray.

Optionally, the hopper includes an auger through which the powder material is controllably advanced into the dispensing tip.

Optionally, the powder delivery station includes a roller and wherein the roller is actuated to both rotate and move across the layer for spreading the powder material.

Optionally, the roller is a forward roller.

Optionally, the powder delivery station includes a plurality of gutters configured to receive excess powder material falling from the edges of the building tray during roller movement across the layer for spreading the powder material.

Optionally, the plurality of gutters includes a first pair of gutters that are actuated to move together with the roller during the spreading of the powder material.

Optionally, the first pair of gutters is located below the lateral ends of the roller.

Optionally, each of the gutters of the first pair of gutters has a length of at least twice the diameter of the roller and is extending on both sides of the roller lateral ends.

Optionally, the powder accumulated in said first pair of gutters is continuously removed from the gutter internal space during the spreading of the powder material via an air suction.

Optionally, the plurality of gutters includes a second pair of gutters positioned at a front end and back end of the building tray with respect to a direction of movement of the roller across the building tray.

Optionally, the second pair of gutters is actuated to move toward and away from the building tray.

Optionally, the second pair of gutters is located at the level of the roller and an air suction is applied to remove the powder accumulated in said gutters.

Optionally, the air suction is applied in the second pair of gutters when the air suction applied in the first pair of gutters is switched off.

Optionally, the powder delivery station is configured to recirculate the excess powder material to the powder hopper.

Optionally, the powder delivery station includes at least one cyclone separator configured to remove air from the powder material collected from the plurality of gutters.

Optionally, the powder delivery station includes a plurality of cyclone separators operated in series.

Optionally, the at least one cyclone separator includes a cap configured to seal an outlet during operation of the cyclone separator.

Optionally, the powder delivery station includes a mesh configured to separate the powder material from debris prior to delivering the powder material to the powder hopper.

Optionally, the die compaction station includes side walls that are configured to be introduced around the building tray.

Optionally, the side walls are configured to be introduced around the building tray based on contact of the layer with the compacting station.

According to an aspect of the present invention there is provided a system for forming a three dimensional object comprising: a system for building a three dimensional green compact as described above; and a post-processing station selected from the group consisting of a second compacting station, a heating station, a sintering station, and any combination thereof.

According to an aspect of the present invention there is provided a method for building a three dimensional green compact comprising: printing a mask pattern on a building surface with solidifiable material; forming a layer by spreading powder material on the mask pattern; compacting the layer; and repeating the printing, forming and compacting until the three dimensional green compact is completed.

Optionally, the three dimensional green compact includes an object being formed and a supporting region.

Optionally, spreading powder material comprises dispensing a plurality of rows of powder material on the building surface and spreading the plurality of rows of powder material with a roller.

Optionally, the plurality of rows of powder material is prepared off-line prior to dispensing on the building tray.

Optionally, the plurality of rows of powder material is positioned perpendicular to a spreading direction.

Optionally, the spreading includes rolling a roller over the powder material.

Optionally, the spreading direction is inverted from one powder layer to the subsequent one.

Optionally, the positioning of the plurality of rows of powder varies from one powder layer to the subsequent one.

Optionally, the method includes collecting excess powder material from the building surface based on the spreading and recirculating the excess powder material to a powder hopper.

Optionally, the collecting and the recirculating are performed online.

Optionally, the method includes suctioning the excess powder to at least one cyclone separator and separating the powder from air in the at least one cyclone separator.

Optionally, the method includes operating a plurality of cyclone separators in series.

Optionally, the method includes filtering the powder material from the at least one cyclone separator with a mesh and delivering powder material filtered through the mesh to a powder hopper, wherein the powder hopper provides the powder material for building the three dimensional green compact.

Optionally, the method includes applying heat during the compacting.

Optionally, the compacting is die compaction.

Optionally, the mask pattern includes a contour of the green compact per layer.

Optionally, the printing, forming and compacting are performed in ambient temperatures.

Optionally, a first layer is formed on a building tray coated with a tacky material.

According to an aspect of the present invention there is provided a method for forming a three dimensional object comprising: building a three dimensional green compact according to the method described above, wherein said three dimensional green compact comprises an object and a support region including solidifiable material; and post-processing the green compact by removing the solidifiable material; separating the object from the support region; and sintering the object.

Optionally, removing the solidifiable material and separating the object from the support region is performed before sintering.

Optionally, removing the solidifiable material is performed during sintering.

Optionally, post-processing further comprises compacting the green compact as a whole.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 1:
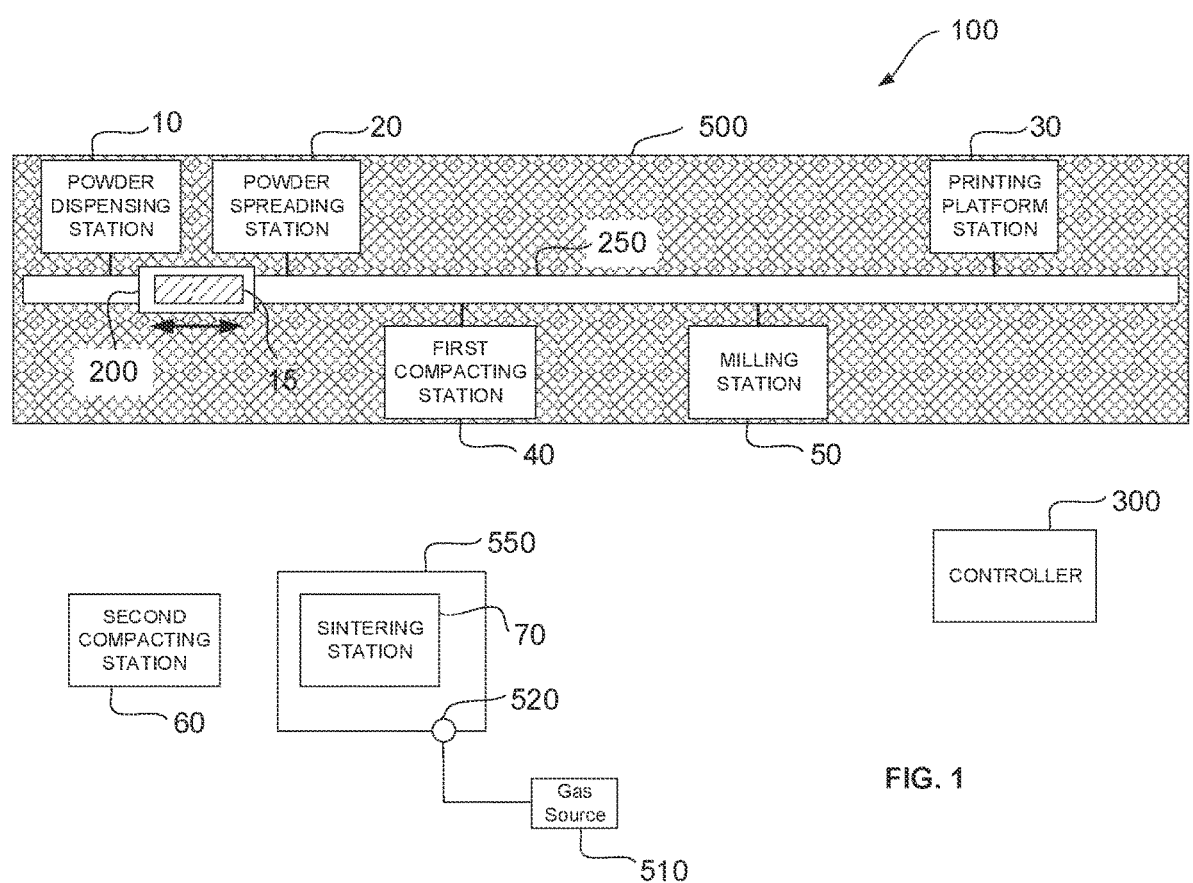
FIG. 1 is a simplified schematic drawing of an exemplary 3D printing system in accordance with some embodiments of the present invention.

DESCRIPTION OF SPECIFIC EMBODIMENTS
OF THE INVENTION

The present invention, in some embodiments thereof, relates to three dimensional (3D) printing with layers of powdered material and, more particularly, but not exclusively, to 3D printing of metal objects with powdered metal as the building material.

As used herein, the term "solidifiable material" refers to material that is a liquid or can be liquefied to allow depositing and can be solidified when deposited on a building surface. An example of solidifiable material is a solidifiable ink, which is liquid when printed on a building surface and can be solidified on it. Non limitative examples of solidifiable inks include, photocurable polymers (also referred to as "photopolymer material"), thermal inks (also referred to as "phase-change inks") an example of which is wax, and any combination thereof. Thermal ink and phase change ink as used herein are interchangeable terms and may be defined as a material that is solid at room temperature (e.g. about 25° C.) has a melting point of less than 120° C., viscosity of less than 50 cPs between the melting point temperature and 120° C. and that evaporates with substantially no carbon traces at a temperature of above 100° C. Substantially, no carbon traces is defined as less than wt. 5% or less than wt. 1%. In some example embodiments, the thermal ink has a melt temperature of between 55-65° C. and a working temperature of about 65-75° C., the viscosity may be between 15-17 cPs. According to embodiments of the present invention, the thermal ink is configured to evaporate in response to heating with little or no carbon traces.

As used herein, the terms "green compact" and "green block" interchangeably refer to a block formed by the successive compaction of layers formed by spreading powder material over a mask of solidifiable material. A green compact typically includes in its volume one or more objects being built, also referred to as "green body(ies)", a supporting region surrounding the green body, and solidifiable material. The solidifiable material defines the contour of the green body and may be used to divide the supporting region into sub-regions that are more easily removed. When referring to a specific layer of the green compact, the green body appears as a "model area" (or "object area") and the supporting region appears as one or more "supporting area(s)".

As used herein, the terms "mask" and "mask pattern" interchangeably refer to a structure formed by the deposition of a solidifiable material onto a building surface (e.g. building tray, preceding layer). The mask pattern generally includes one or more solid structural elements such as lines, points, corners, perimeters, or any other geometric structure that results from the solidification of the solidifiable material. The solidifiable material may solidify either spontaneously or after activation of an external trigger, e.g. UV light.

As used herein, the term "printing station" or "3D printing station" includes any apparatus suitable to deposit one or more solidifiable materials on a building surface. The printing station may include a printhead, an extruder, and/or any other suitable means known in the art.

According to some embodiments of the present invention, there is provided a 3D printing system and method for building an object for sintering using a mask pattern formed with at least one solidifiable material such as a phase-change ink, a thermal ink, a photopolymer material, wax or any combination thereof. Optionally, the thermal ink has low carbon content and is configured to evaporate in response to heating leaving little or no carbon traces. In some exemplary embodiments, the system and method is applied to building objects with pure metals such as aluminum. It is noted that the system and method is not limited for use with pure aluminum and can also be used for building with metal alloys, plastics, ceramics and/or a combination of different materials.

According to some embodiments of the present invention, the system includes a building tray, a 3D printer for printing a mask pattern, a powder dispenser with spreader for applying powdered material over the mask, a first compaction unit for compacting the layers and optionally a milling (or grinding) unit for shaving off the upper surface of each a layer. According to some exemplary embodiments, a controlled linear drive may repeatedly advance the building tray to each of the 3D printer (also referred to as "digital printing station" or "printing station"), powder dispensing station and powder spreading station (that are combined in some embodiments into a "powder delivery station") and the compacting station (also referred to as "process compaction station"), for building the plurality of layers. Optionally, the building tray is coated with a tacky material such as glue prior to building the first layer.

In some exemplary embodiments, the system additionally includes a second compacting station, and a furnace sintering station for compacting and then sintering the multiple layers at the termination of the layer building process, respectively. In some embodiments, the mask burns during a first stage in the sintering process (in specific conditions and gas environment) and then the multiple layers are merged. In some other example embodiments, the mask is formed from thermal ink and the thermal ink is configured to evaporate as opposed to burn in a dedicated heating process prior to sintering or during sintering. After the dedicated heating process or after the sintering, the object is separated from the surrounding material.

According to some exemplary embodiments, a powder dispenser spreads a plurality of rows of powder material per layer. In some example embodiments, the rows are positioned on the building tray so that they are parallel with the spreader, e.g. parallel with an axis of rotation of the spreader and perpendicular to linear movement of the roller across the building tray. Optionally, 2-20 rows of powder are spread per layer. In some example embodiments, the rows are spread off-line over a spreading tray comprising a plurality of troughs and then transferred to the building tray (for example by opening or flipping simultaneously the plurality of troughs). Dispensing a plurality of rows over the building tray may be configured to help the spreader spread the powder more evenly over the building tray and may also maintain a constant height for the layer across the building tray. The spreader is typically a roller with a defined diameter that is actuated to rotate while moving across the building tray to spread the powder. During spreading, excess powder may be collected in gutters positioned around the building tray.

According to some example embodiments, the powder collected in the gutters is mixed into a container, e.g. a hopper including a supply of powder for building the subsequent layers. Suction may be applied to collect the material in the gutters and advance the material through a powder recirculation system. In some example embodiments, an excess amount of powder is dispensed per layer on the building tray to facilitate spreading an even layer of powder. Optionally, the amount of powder that is dispensed is 2 to 5 times more than the amount used per layer. During spreading, a relatively large portion of the powder that is dispensed per layer is pushed into the gutters and circulated back into the hopper. Optionally, the recirculated powder is actively mixed into the powder supply in the hopper.

In some example embodiments, gutters are positioned on each of the four sides of the building tray. In some example embodiments, the front and back gutters (in relation to movement direction of the roller) have a small range of motion that allow them to move toward the building tray to collect the powder and move away from the building tray to allow the building tray to move in the vertical direction and lateral direction and advance to the next station. Optionally, between 50%-80% of the powder that is dispensed is collected in the gutters and recycled. The powder recirculation system facilitates a more efficient use of the powder and avoids unnecessary accumulation of powder.

In some example embodiments, the powder recirculation system includes gutters to collect the excess powder, a vacuum pump to transport the excess powder, one or more cyclone separators to gather powder from the air, a mesh to separate any debris from the gathered powder and a vibrator to facilitate filtering through the mesh. In some examples, the powder recirculation system includes a series of cyclone separators. Optionally, the series facilitates collecting powder particles with different sizes and weights at a high efficiency, e.g. for non-homogenous powders. In some example embodiments, the outlet at the bottom of each of the cyclone separators is sealed during operation of the cyclone separator. Optionally, the seal is released on all the cyclone separators once the separation activity is complete and the powder is then dispensed on a mesh that filters the powder from any debris or clumped powder that may have been collected. Optionally, the mesh is actuated by a vibrator. The powder filtered through the mesh may then be introduced into the hopper and mixed into the powder in the hopper.

According to some exemplary embodiments, the 3D printer is an inkjet 3D printer, e.g. a PolyJet™ printer provided by Stratasys Ltd., Israel. In specific embodiments, the mask pattern printed by the 3D printer traces a perimeter of each layer pattern and optionally also includes radial lines that extend from points along the perimeter toward edges of the building tray. The radial lines of ink material may facilitate separating the object within the traced perimeter of the layer patterns from the building material outside the perimeter of the masks that is not part of the object. During the layer building process, building material may serve as support for building negative slope surfaces of the object or hollow volumes included in the object. In some exemplary embodiments, the 3D printer includes inkjet printing heads assembled on a scanning printing block that moves over the building tray to scan the layer during printing, while the building tray remains stationary. Alternatively, a precision stage may be used to advance the building tray in the scanning direction while the inkjet printing head block remains stationary in that direction, and movable in the orthogonal direction or completely stationary. In some embodiments, the entire mask pattern of the specific layer may be printed in a single pass.

In some exemplary embodiments, the compaction unit is a die compaction unit including walls that surround the building tray and the layer of powder spread on it and maintains the footprint of the layers. In an example, the footprint of the tray may be between 20×20 cm to 25×25 cm. Optionally, the compaction unit includes a hydraulic press and operates in room temperature. The hydraulic press may press each layer with up to 300 MPa of pressure, e.g. in a case of the use of al6061Aluminum powder. In most cases, the compaction pressure per layer may be lower than 300 MPa, e.g. less than 100 MPa. The density (measured in $gr/cm^3$) of the powder is typically lower than the density of the wrought material as the powder volume contains air. The quality of the compaction can be measured by the relative density, defined by the compacted powder density divided by the wrought material density (in %). The spreading pressure exerted by the roller may increase the density of a layer from about 50% to 60%, and the per layer compaction pressure may increase the density of a layer to about 70-90%. Optionally an average layer thickness prior to compaction may be between 100-300 μm.

During compaction the solidifiable material forming the mask pattern, may be subject to deformation near the upper surface of the layer. A milling (or grinding) unit optionally provides for removing the portion of the layer that may be subject to deformation. Optionally, 10%-50% of the layer is removed by the milling (or grinding) unit. Optionally, 20-50 μm of the layer is removed. Optionally, a thickness of the layer is defined so that after compaction and optional milling (or grinding), the layer will have a desired pre-defined thickness. An additional mask may then be printed on the existing layer after the milling (or grinding) to continue the layer building process. According to some exemplary embodiments, the entire layer building process may be performed at ambient temperature. The ability to operate at ambient temperature is typically associated with lower cost of operation and also reduced cost of the system. Operation at high temperatures typically requires more safety measures that are typically associated with higher costs.

According to some exemplary embodiments, the ensemble of layers forming the green compact may be compacted again in a second compacting station at higher pressure and temperature and also for a longer duration, after the layer building process is complete. Alternatively, the second compacting station is not required.

Building with aluminum is known to be advantageous due to its light weight, heat and electricity conduction, and its relative resistance to corrosion. Typically, the melting temperature of aluminum is relatively low. One of the challenges of building with aluminum powder is that the aluminum particles of the powder tend to form an aluminum oxide coating, e.g. alumina. The aluminum oxide coating introduces a barrier between the aluminum particles that interferes with bonding of the particles during sintering. The final result is typically an object with reduced strength due to poor bonding between the powdered elements.

In some exemplary embodiments, the compaction strength applied in the compaction process is defined to provide permanent deformation of the powder layer, e.g. press the powder particles past its elastic state and into its plastic state. Typically, the density and thereby the mechanical strength of the object is improved by compaction. The compaction also promotes bonding during sintering by breaking up the alumina layer to expose the aluminum and allow direct engagement between aluminum particles of the powdered material. Optionally, compaction increases thermal conductivity of the powder layer and allows for more uniform sintering. Optionally, compaction improves the bonding between layers and prevents layer separation that may occur after sintering. In some example embodiments, the compaction per layer results in a green compact in the form of a block that includes one or more green bodies (i.e., objects being formed) optionally separated by a solidifiable material deposited by the 3D printer such as solid phase-change ink or photopolymer material (i.e. the mask pattern).

In some exemplary embodiments, the second compacting station compacts the ensemble at 150-350 MPa pressure at a temperature of up to 430° C. for between 1-6 minutes. Optionally, this second compacting station is also a die compaction station that maintains the Z-axis accuracy. Although the defined object is only within perimeters of the mask pattern, the additional powder material forming the rectangular layers is maintained and used to support the shape of the object during the die compaction. Optionally, it is the second compacting station that finalizes the compaction of the green compact.

Furnace sintering is typically applied after a final compaction stage but may also be applied directly after the final layer of the green compact has been produced. Temperatures and duration of sintering typically depend on the powder material used and optionally on the size of the object. In some exemplary embodiments, the powder material is aluminum. The first stage of the furnace sintering process may be at 300 to 400° C. for a period of 20 to 180 minutes. The furnace environment can be inert (Nitrogen) or aerated at this stage. In some embodiments, where the solidifiable material forming the mask includes a photopolymer material, a first stage during the sintering process may be configured to burn the photopolymer material. The polymer is burned using its structural oxygen molecules and does not need external oxygen supply. Sintering at higher temperatures may typically be performed in a nitrogen environment. Optionally, the object may be at 570° C. to 630° C. for 60 to 180 minutes, for Aluminum powder. For stainless steel powder, for instance, the temperature may reach 1250° C. Optionally, the furnace is capable of changing temperature at a rate of 2-20° C./min. Typically, sintering is performed over a plurality of stages, each stage at a defined temperature and for a defined period. Optionally, the block is cooled after the first stage, and the object is extracted and sintering completed.

In some example embodiments, the 3D printing system described herein provides for printing at improved speed. For example, printing time per layer may be between 25-35 seconds and an estimated building time for the green body, i.e. object being printed, including about 400 layers may be for example 4 hours. A block that is a green compact that is built on the building tray may include a plurality of embedded green bodies, e.g. 1-15 objects. An example footprint of the block may be 20×20 cm.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 shows a simplified block diagram of an exemplary 3D printing system in accordance with some embodiments of the present invention. According to some embodiments of the present invention, a 3D printing system 100 is integrated on a working platform 500. According to some embodiments of the present invention, working platform 500 includes a precision stage 250 on which a building tray 200 is advanced through a plurality of stations for printing a green compact 15 one layer at a time. Typically, precision stage 250 is a linear stage, e.g. an X-Z stage providing motion along a single axis, e.g. an X axis while building a layer and also providing motion in the vertical direction (Z-axis) for adjusting height of tray 200, e.g. lowering tray 200 as each new layer is added.

According to some embodiments of the present invention, working platform 500 includes a printing platform station 30, for printing a mask pattern, a powder dispensing station 10 for dispensing a powder layer on tray 200, a powder spreading station 20 for spreading a layer of dispensed powder on the printed mask pattern, a compacting station 40 for compacting the layer of powder, and a milling station 50 for shaving upper surface of a current layer prior to printing another layer. Typically for each layer, printing tray 200 advances to each of the stations and then repeats the process until all the layers have been printed. In some exemplary embodiments, tray 200 is advanced in one direction with a stop at printing platform station 30 and then reverses direction with stops at powder dispensing station 10, powder spreading station 20, compacting station 40 and milling station 50. According to some embodiments of the present invention, a controller 300 controls operation of 3D printing system 100 and coordinates operation of each of the stations with positioning and/or movement of tray 200 on precision stage 250. Typically, controller 300 includes and/or is associated with memory and processing ability.

According to some exemplary embodiments, at the end of the layer building process, green compact 15 may be advanced or positioned in a second compacting station 60 for final compaction and then to sintering station 70 for sintering. Alternatively, the first compacting station 40 completes the compaction during the layer building process or at the end of the layer building process. In some specific embodiments, during the sintering process, the mask built by printing station 30 burns and the green compact 15 solidifies. The mask burning allows green compact 15 defined within the layer wise perimeters of the mask to be separated from the portion of the layers outside the perimeters.

Optionally, inert gas source 510 is source of nitrogen. Typically, sintering station 70 and optionally second compacting station 60 are stand alone stations that are separate from working platform 500. Optionally, green compact 15 is manually positioned into sintering station 70 and optionally second compacting station 60 and not by precision stage 250.

Optionally, each of second compacting station 60 and sintering station 70 have a separate controller for operating the respective station.

Figure 2:
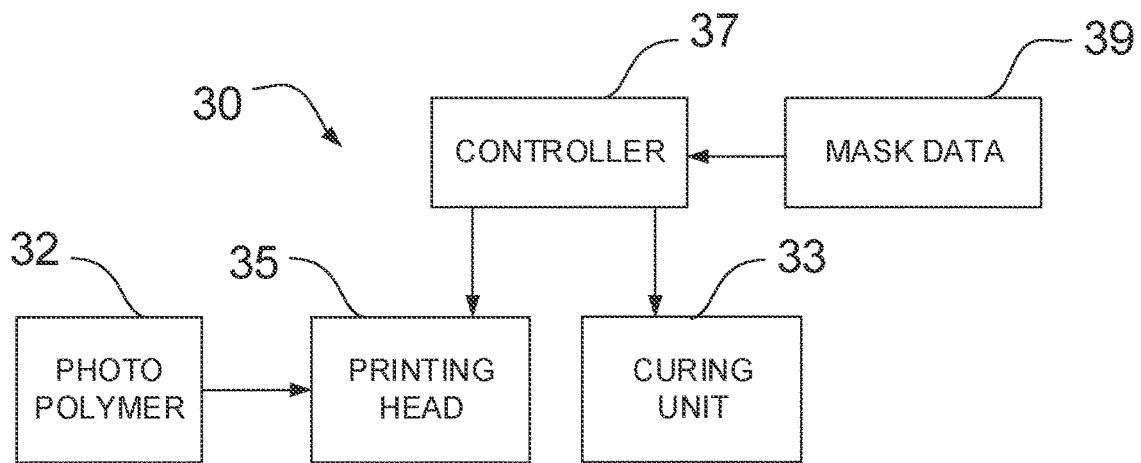
FIG. 2 is a simplified block diagram of an exemplary printer for printing layers of masks for defining the object accordance with some embodiments of the present invention.

Reference is now made to FIG. 2 showing a simplified schematic drawing of an exemplary 3D printing system in accordance with some embodiments of the present invention. According to some embodiments of the present invention, printing platform station 30 includes a direct inkjet printing head 35 that deposits photopolymer material 32 based on a generated mask data 39. Typically, the mask pattern is defined by mask data 39 that is typically stored in memory. Typically, the mask data is generated by a computer aided design (CAD) software program or the like.

In some exemplary embodiments, printing head 35 is stationary and printer controller 37 together with system controller 300 control timing for depositing material 32 as tray 200 advances under printing head 35. Typically a curing unit 33 cures the deposited material as tray 200 advances under printing head 35. Optionally, printing head 35 and curing unit 33 are mounted on a Y axis stage and move in a direction perpendicular to tray 200. Alternatively, tray 200 is stationary during printing and printing head 35 and curing unit 33 are supported by an X, Y or XY stage for moving printing head 35 in one or more directions. Typically, printing head 35 includes an array of nozzles through which material is selectively deposited.

Figure 3A:
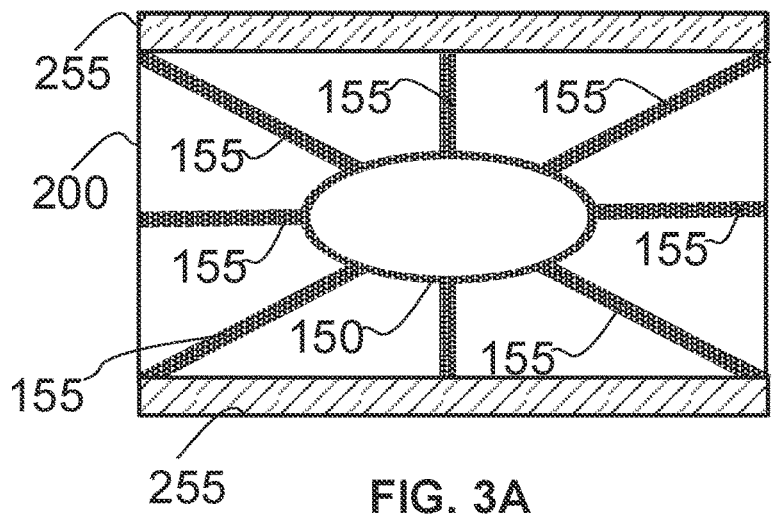
FIGS. 3A and 3B are simplified schematic representations of two types of mask layer patterns printed on a building tray in accordance with some embodiments of the present invention.

Reference is now made to FIG. 3A showing a simplified schematic representation of one mask layer pattern printed on a building tray in accordance with some embodiments of the present invention. According to some embodiments of the present invention, printing head 35 prints a contour 150 of the object being formed at each layer with a solidifiable material, such as photopolymer material or phase-change ink. Typically, the mask first layer is printed on building tray 200 or other building surface. In some exemplary embodiments, printing head additionally prints rays 155 extending from contour 150 toward edges of building tray 200 or toward gutters 255 at edges of building tray 200. In some exemplary embodiments, rays 155 introduce cuts in the powder outside of contour 150 so that that area outside contour 150 (i.e. the supporting area) can be easily separated from the object within the contour area after the building layers are solidified at the end of the building process. Typically, unmasked/unpatterned portions are filled with the powder material that is used to construct the object.

Figure 3B:
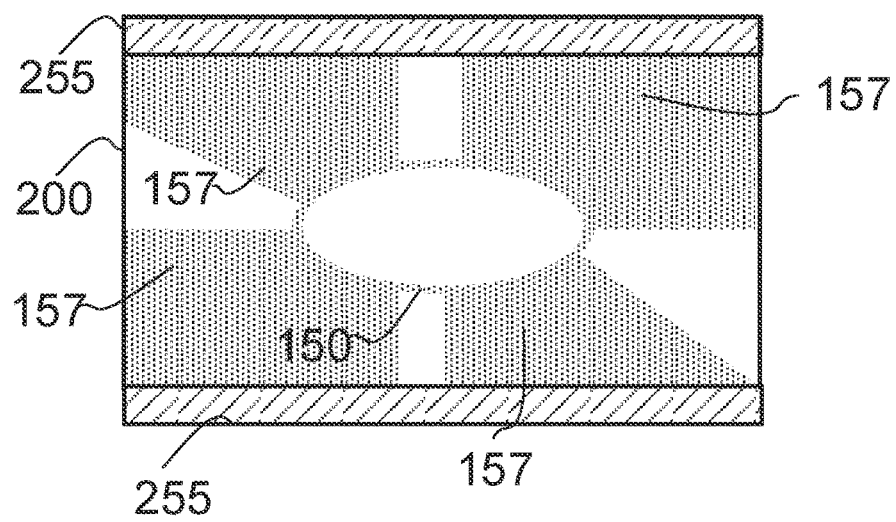

Referring now to FIG. 3B, in some exemplary embodiments, solidifiable material may be patterned to fully or partially occupy supporting areas 157 as opposed to rays 155 outside contour 150 to fill portions of the layer that are not to become part of the object. Optionally, supporting areas are formed by a combination of solidifiable material structures and powder material.

In some exemplary embodiments, the volume of powder material used to form the layers may be conserved by printing a portion of the area outside contour 150 with solidifiable material. In some exemplary embodiments, the amount of solidifiable material printed outside contour 150 depends on the type of support that the solidifiable material provides around the object.

Figure 4:
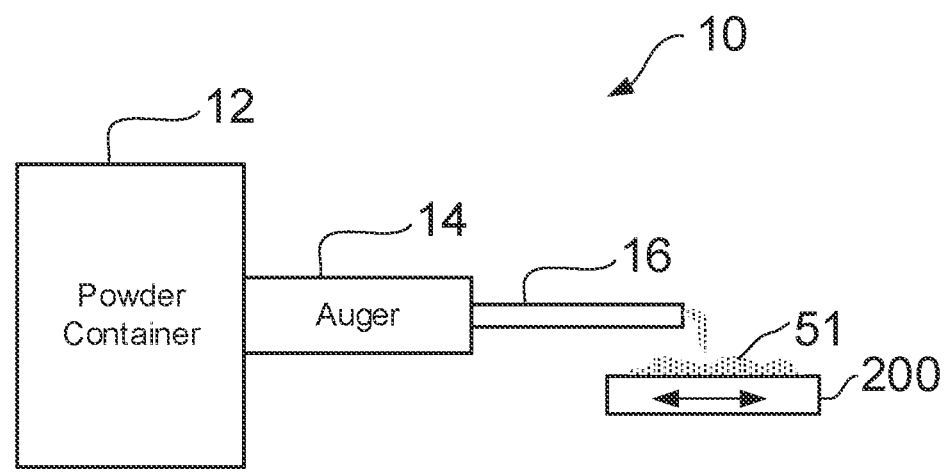
FIG. 4 is a simplified block diagram of a powder dispensing station in accordance with some embodiments of the present invention.

Reference is now made to FIG. 4 showing a simplified block diagram of a powder dispensing station in accordance with some embodiments of the present invention. Typically, powder dispensing station 10 includes a container 12 storing powder 51, an auger 14 for extracting a defined quantity and/or volume of powder 51 through a tube 16 and onto tray 200. In some exemplary embodiments, the defined volume is adjusted over the course of the building process based on feedback from system 100 and/or controller 300. Optionally, powder 51 is dispensed while tray 200 is in motion so that powder 51 is spread over a length of tray 200. In some exemplary embodiments, powder dispensing station 10 is adapted to deliver powder aluminum. In other exemplary embodiments, other metals, alloys and/or materials are stored and delivered by powder dispensing station 10. Optionally, container 12 includes a plurality of components that are mixed. Optionally, container 12 includes a mechanism for mixing contents stored.

Figure 5:
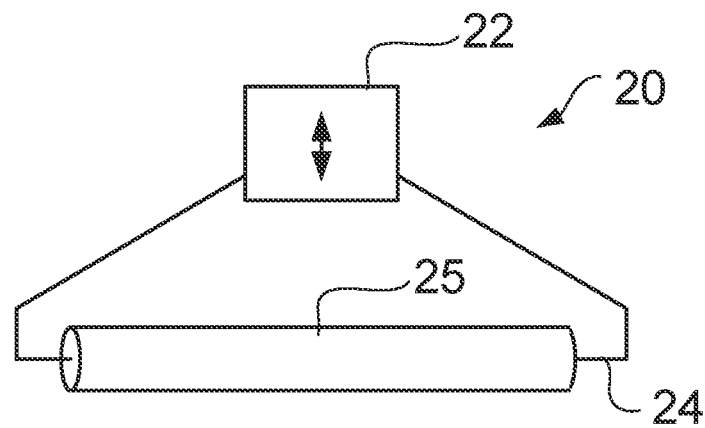
FIG. 5 is a simplified block diagram of a powder spreading station in accordance with some embodiments of the present invention.

Reference is now made to FIG. 5 showing a simplified block diagram of a powder spreading station in accordance with some embodiments of the present invention. Typically, spreading station 20 includes a motorized roller 25 rotatably mounted on an axle 24. In some exemplary embodiments, a linear motor 22 engages axle 24 and moves across the layer for spreading an even layer of powder. In some exemplary embodiments, a height of table 200 is adjusted, e.g. moved up/down with a Z stage in order to obtain a defined layer thickness. In some exemplary embodiments, a powder layer of about 150 μm thick, e.g. 100 μm to 300 μm thick is spread with roller 25. Typically, the powder layer is spread over the mask layer and has a height above the mask layer prior to compaction. Typically, after compaction, the height of the powder layer is reduced to the height of the mask layer. In some exemplary embodiments, a thickness of a layer after compaction is monitored and a height of tray 200 is adjusted to alter a thickness of a current layer to compensate for drifts or variations in layer thicknesses of one or more previous layers. Optionally, a mechanism of powder recirculation is connected to container 12 for collecting the non-spread powder and returning it back to container 12.

In some exemplary embodiments, roller 25 extends substantially over an entire length of tray 200 and only one pass of the roller is required to spread the powder.

Optionally, roller 25 is operated while tray 200 is in motion. Optionally, roller 25 is held at a height above tray 200 and is lowered with a Z elevator as required for spreading.

Figure 6:
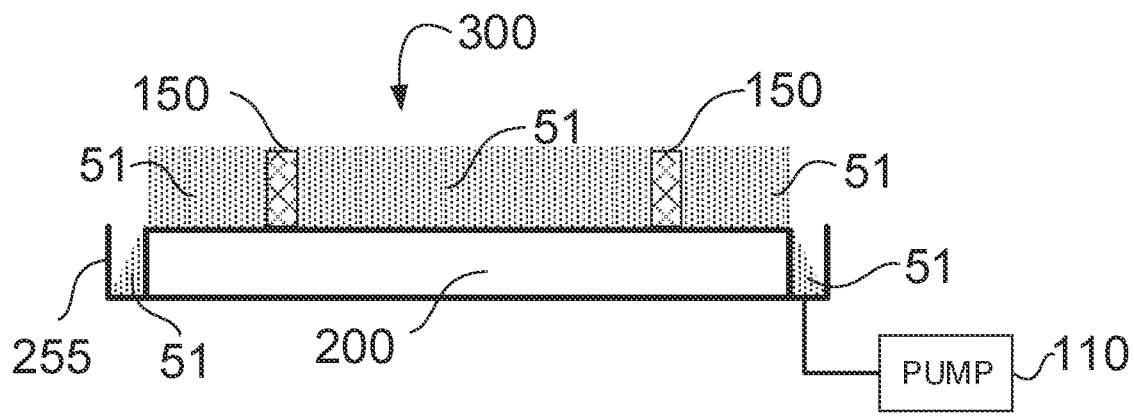
FIG. 6 is a simplified schematic cross sectional view of a green compact layer including a printed mask pattern and a powder material in accordance with some embodiments of the present invention.

Reference is now made to FIG. 6 showing a simplified schematic cross sectional view of a green compact layer including a printed mask pattern and powder material in accordance with some embodiments of the present invention. According to some embodiments of the present invention, a layer 300 is formed by first printing a mask pattern 150 and then spreading powder 51 over the mask pattern. Layer 300 is typically defined so that powder 51 reaches same height as a height of mask 150.

In some example embodiments, a layer of glue or other tacky material is spread on tray 200 prior to building over tray 200, e.g. prior to printing the first mask 150. The layer of glue may be a 1-10 μm thick. In some example embodiments the thin layer of glue stabilizes the layers on the tray and also provides for separating the layers from the building tray at the termination of the layer building process. In some example embodiments, the thickness of the glue layer as well as its mechanical properties are selected to facilitate piercing of the powder through the glue layer. The piercing may help stabilize the first layer(s) on the building tray.

Figure 7A:
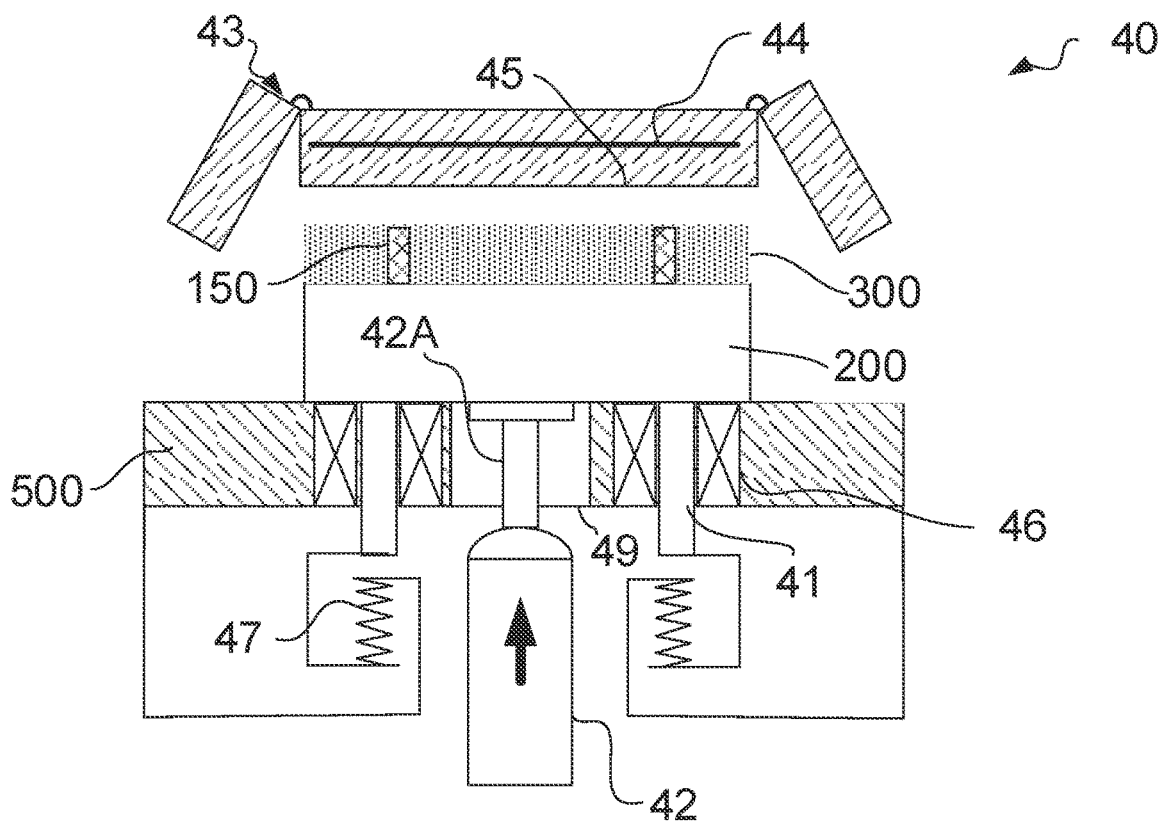
FIGS. 7A and 7B are simplified schematic drawings of an exemplary compacting system in a released and compressed state respectively in accordance with some embodiments of the present invention.
Figure 7B:
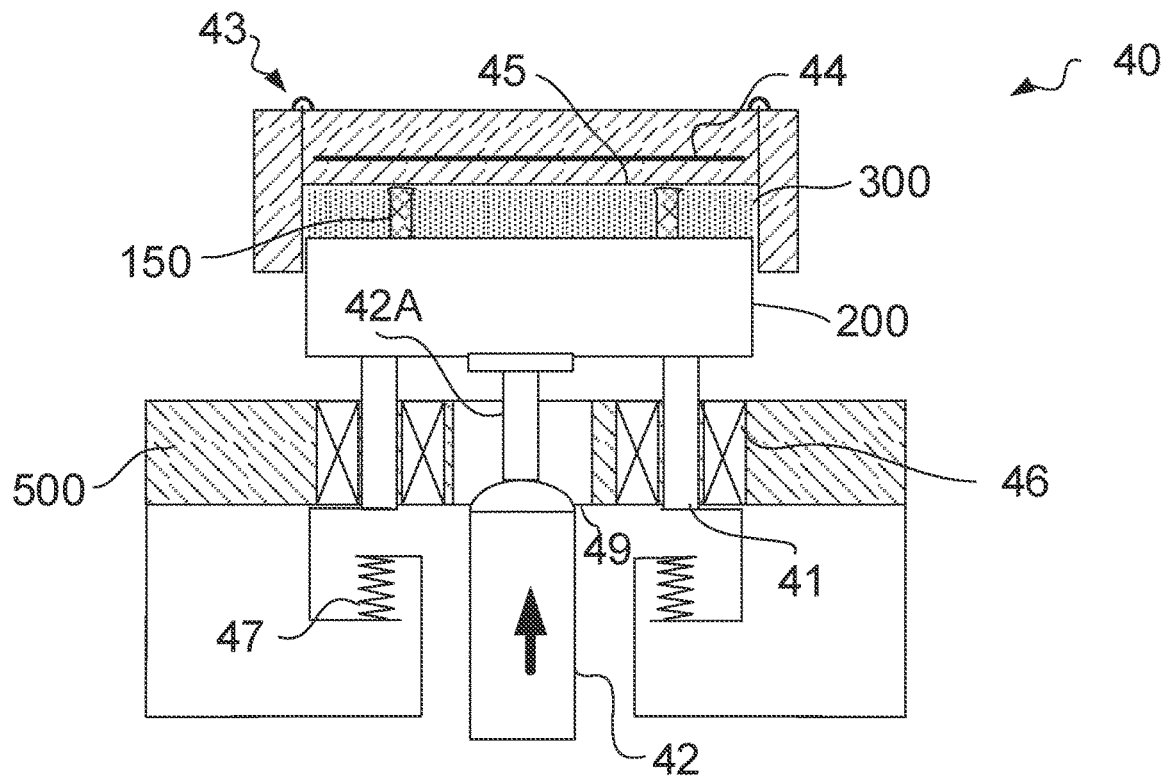

Reference is now made to FIGS. 7A and 7B showing simplified schematic drawings of an exemplary die compaction station shown in a released and compressed state respectively in accordance with some embodiments of the present invention.

According to some embodiments of the present invention, a layer 300 is compacted after spreading the powder layer over the mask layer. According to some embodiments of the present invention, as the compaction process it performed per layer, the compaction station generates a die per layer.

According to some embodiments of the present invention, the compaction station includes a piston 42 that is operative to provide the compaction pressure for compacting a layer 300. According to some embodiments of the present invention, during compaction, piston 42 is raised through a bore 49 and optionally pushes rod 42A in working platform 500 or precision stage 250 and lifts building tray 200 towards surface 45 positioned above tray 200. Optionally, the addition of rod 42A reduces the distance that piston 42 is required to move to achieve the compaction.

Optionally, once layer 300 makes contact with surface 45 walls 43 close in around the layer 300 to maintain a constant footprint of the layer 300 during compaction.

In some exemplary embodiments, tray 200 is secured to one or more linear guides 41 that ride along linear bearings 46 as piston 42 elevates and/or lowers tray 200.

Optionally, tray 200 is lifted against one or more compression springs 47. In some exemplary embodiments, gravitational force as well as springs 47 provide for lowering piston 42 after compacting layer 300.

According to some embodiments of the present invention, a pressure of up to 250 MPa or 300 MPa is applied to compact a powder and mask layer. Typically, the applied pressure provides for removing air and bringing powder in layer 300 past its elastic state so that permanent deformation of the layer is achieved. Optionally, the compaction provides for increasing the relative density of the layer to about 70% to 75%. For several alloys the relative density may reach up to 90%. Optionally, compaction reduces the thickness of a layer by up to 25%. Optionally, a compaction pressure of around 50-90 MPa is applied. Optionally, the compaction is performed at room temperature.

In some exemplary embodiments, upper surface 45 is heated, e.g. pre-heated with a heating element 44 during compaction and warm die compaction is performed. When heating surface 45, layer 300 can reach its plastic and/or permanent deformation state with less pressure applied on the layer. Optionally, in aluminum powder case, upper surface 45 is heated to a temperature of 150° C., e.g. 150°-200° C. Typically there is a tradeoff between compaction temperature and pressure. Increasing the temperature during compaction may provide for reaching plastic deformation at lower pressure. On the other hand, reducing temperature of upper surface 45 may reduce the energy efficiency of the compaction since higher pressure may be required.

Typically, the pressure and temperature applied is defined based on the powder material and the thickness of layer 300.

In some exemplary embodiments, e.g. when aluminum powder is used, the compaction is operative to break up the oxide layer, e.g. the alumina on the powdered particles. Typically, exposing the aluminum promotes direct engagement between aluminum particles of the powdered material and improves bonding of the particles during sintering.

In some exemplary embodiments, mask pattern 150 may deform during compaction. Typically, deformation will occur near surface 45 where the mask pattern 150 is exposed. Powder 51 held by walls 43 surrounding the layer typically provide support for mask pattern 150 below the upper surface so that no deformation occurs below the upper surface of the layer.

According to some embodiments of the present invention, the height of the object, e.g. height of one or more layers of the object as it is being built, is detected, determined and/or sensed at the compaction station. Optionally, a height of tray 200 while pressed against surface 45 is detected. According to some embodiments of the present invention, controller 300 (FIG. 1) monitors the height and/or the change in height and provides input to powder dispensing station and/or Z stage of tray 200 when adjustments in layer thicknesses are required to compensate for a drift from a desired height and/or change in height. In some exemplary embodiments, controller 300 uses one or more lookup tables stored in memory or mathematical formula to control adjustments in layer thicknesses.

In some exemplary embodiments, one or more stations along a path of precision stage 250 are supported on rails extending along the path and/or by one or more bridges, e.g. bridge positioned over working platform 500. In some exemplary embodiments, compacting station 40 includes a piston 42 positioned below working platform 500 that is operated to raise tray 200 with rod 42A toward a flattening surface 45 positioned above tray 200 or other surface as is described in further detail herein below.

Figure 8A:
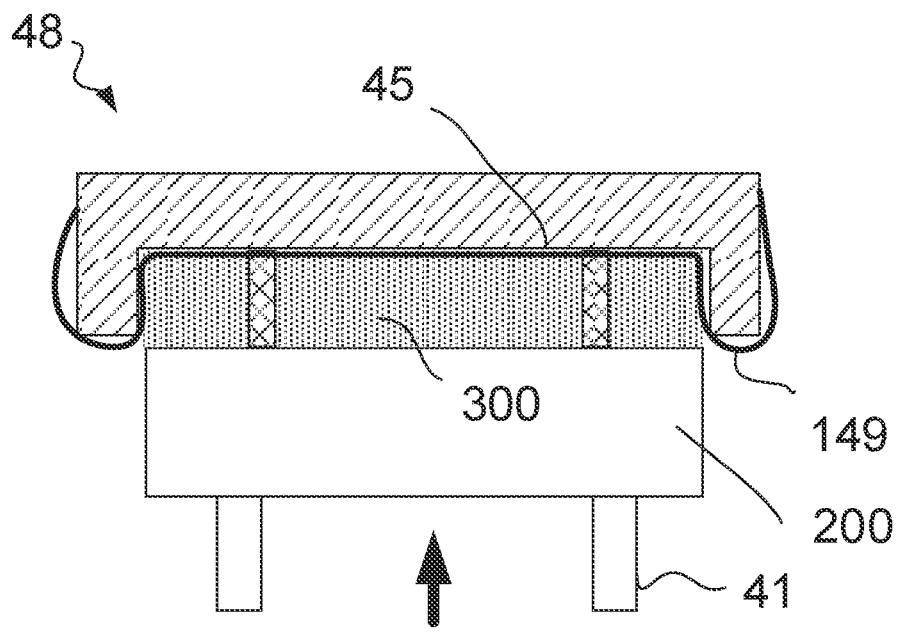
FIGS. 8A and 8B are simplified schematic drawings of an exemplary anti-peeling mechanism for a compacting system in a compacting state and a post compacting state respectively in accordance with some embodiments of the present invention.
Figure 8B:
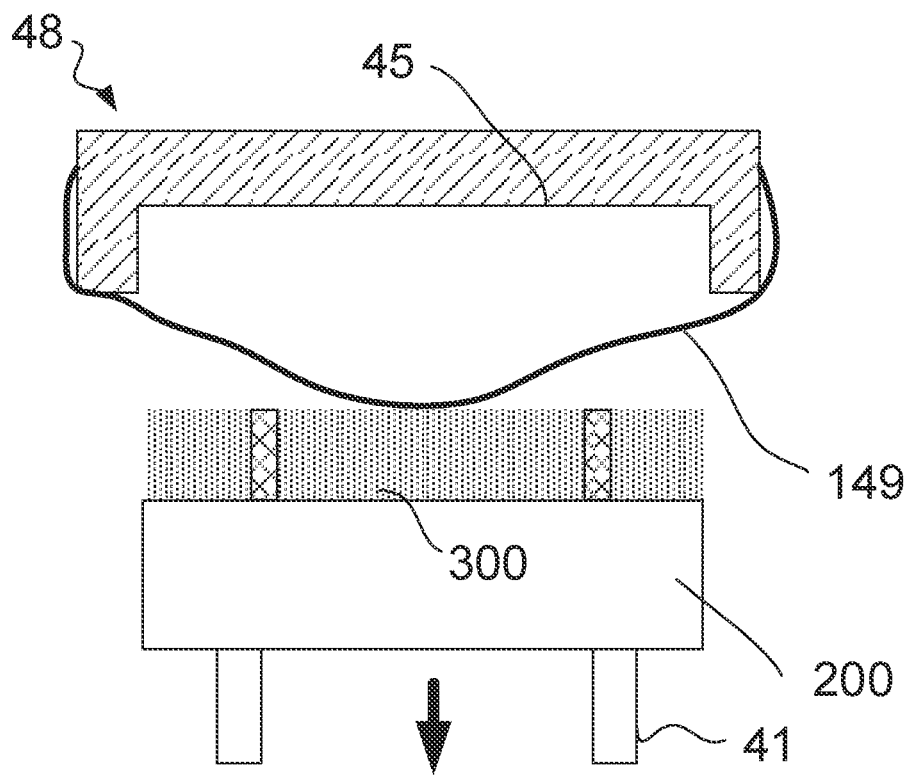

Reference is now made to FIGS. 8A and 8B showing a simplified schematic drawings of an exemplary anti-peeling mechanism for a compacting system shown in a compacting state and a post compacting state respectively both in accordance with some embodiments of the present invention. According to some embodiments of the present invention, a foil and/or film 149 is attached to the sides of 45 loosely. During compaction, foil 149 pressed between surface of 45 and layer 300. At the end of the compaction process, building tray 200 moves down, and the layer is separated gently from the foil, and avoiding layer peeling) is positioned between layer 300 and contact surface 45 of die 48 during compaction. Optionally, the foil has a thickness between 0.1-0.4 mm, e.g. 0.3 mm. Optionally, the foil is a stainless steel 302; 301 or 316L foil. Typically, foil 149 protects surface 45 from accumulating powder and also prevents substantial peeling of layer 300 during separation of surface 45. The present inventor has found that this gradual detachment of the foil avoids peeling and/or loss of material from layer 300 on foil 149.

Figure 9:
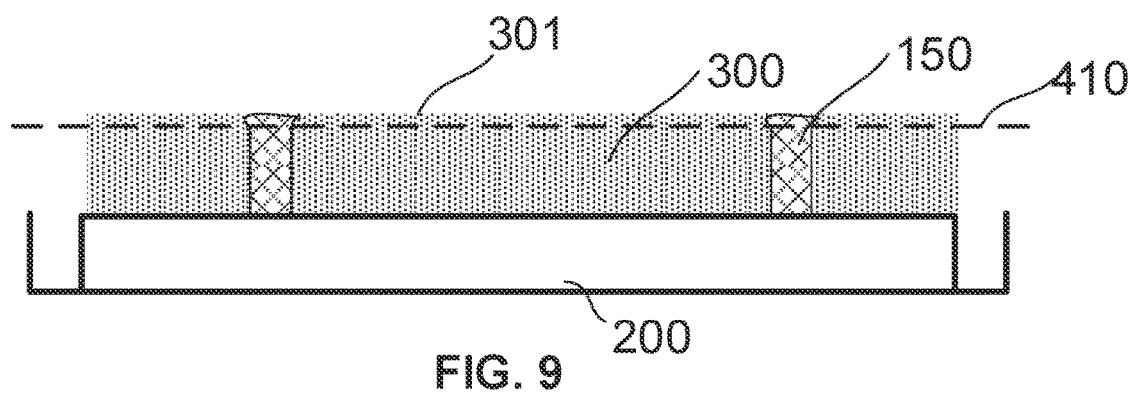
FIG. 9 is a simplified schematic representation of a layer after process compaction and before milling in accordance with some embodiments of the present invention.

Reference is now made to FIG. 9 showing a simplified schematic representation of a layer after process compaction and before milling (or grinding) in accordance with some embodiments of the present invention. According to some exemplary embodiments, an upper portion 301 of layer 300 may include deformation in the mask 150 due to the compaction. According to some exemplary embodiments, layer 300 is milled (or grinded) to remove the upper surface 301 including the deformation. The portion that is removed is schematically indicated by line 410. A layer may have a thickness of about 50-180 μm after process compaction and prior to milling (or grinding). Milling (or grinding) may shave off between 10-50 μm of layer 300. In some exemplary embodiments, layer 300 may be defined to have a thickness of about 25-120 μm after process compaction and milling.

Figure 10:
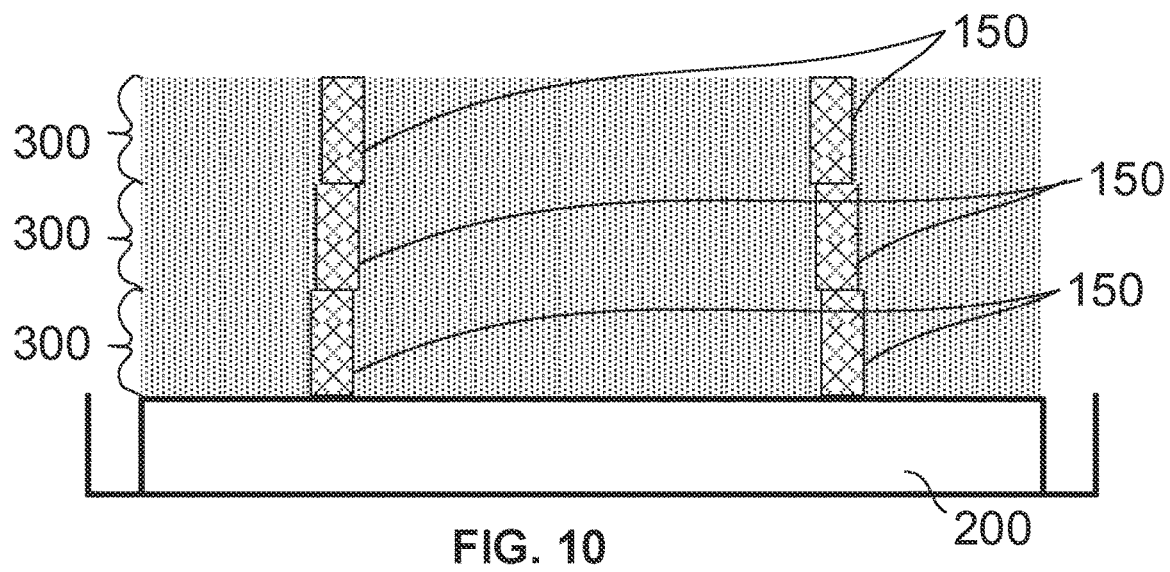
FIG. 10 is a simplified schematic representation of three printed layers for forming an object in accordance with some embodiments of the present invention.

Reference is now made to FIG. 10 showing a simplified schematic representation of three printed layers for forming an object in accordance with some embodiments of the present invention. According to some embodiments of the present invention, mask pattern 150 may typically form a continuous boundary or contour with one mask pattern 150 touching another mask pattern as additional layers 300 are added. This continuous boundary formed from stacked mask patterns 150 defines a 3D contour of the object being formed and sections within the supporting areas outside of the object at the end of the green compact forming process.

Figure 11:
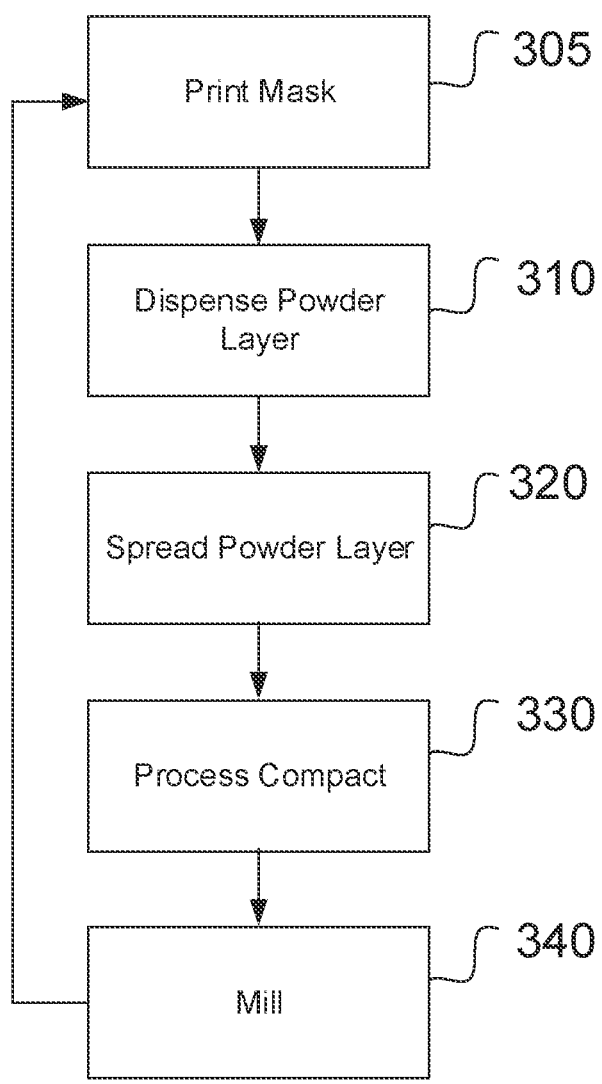
FIG. 11 is a simplified flow chart of an exemplary method for constructing layers of a green compact by 3D printing in accordance with some embodiments of the present invention.

Reference is now made to FIG. 11 is a simplified flow chart of an exemplary method for constructing an object by 3D printing in accordance with some embodiments of the present invention. According to some embodiments of the present invention, the method includes printing a mask pattern per layer that defines a boundary of an object or green body being formed and also extensions that later facilitate separating the object from surrounding material (block 305). After printing the mask, the method further includes dispensing powder layer on a building tray (block 310) and spreading the powder layer over the mask pattern to obtain a uniform layer of powder (block 320). In some exemplary embodiments, the powder is aluminum. Optionally, other metals or alternatively ceramic material is used as the building material, e.g. the powder. Optionally, the powder is a mix of a plurality of materials. In some exemplary embodiments, each layer is compacted (block 330) and then the upper surface of the compacted layer is optionally milled (block 340) to remove any deformations formed on the upper surface in the mask due to compaction. Typically, the compaction provides for removing air from the printed layer. Optionally, the compaction also provides for breaking an oxidation coating that typically forms on particles of the metal powder, e.g. aluminum powder. Typically, these steps are repeated until all the layers have been printed.

According to some exemplary embodiments, the layer building processes as described in FIG. 11 may be performed on an automated stage and in ambient temperatures. Due to the ambient temperature conditions, there is no requirement to provide a positive flow of inert gas or to add additional precautions that may typically be needed when working at high temperatures or inert gas environment. Typically, providing a positive flow of inert gas or adding precautions against combustion is associated with increased cost. Possible advantages of the layer building process as described herein include safer operation and lower cost.

Figure 12:
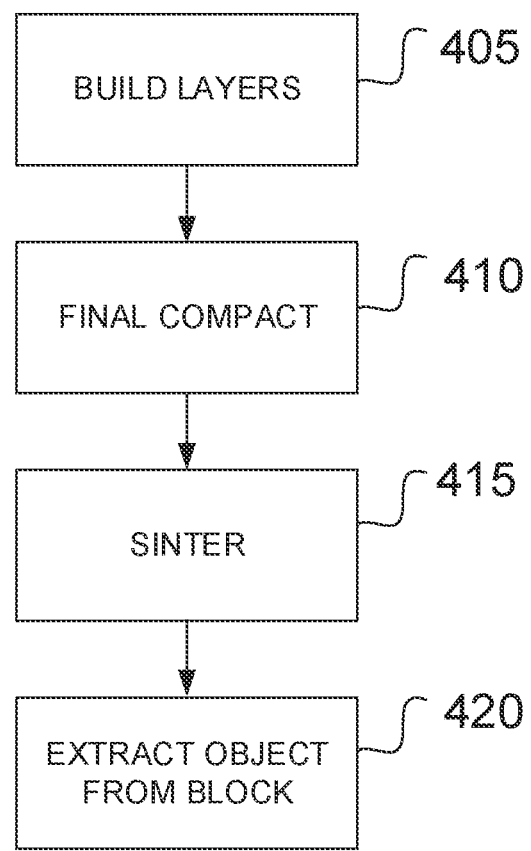
FIG. 12 is a simplified flow chart of an exemplary method for forming an object based on 3D printing in accordance with some embodiments of the present invention.

Reference is now made to FIG. 12 showing a simplified flow chart of an exemplary method for forming an object based on 3D printing in accordance with some embodiments of the present invention. According to some exemplary embodiments, once the building layer process is complete, the built layers forming a green compact are removed from the automated stage (block 405) and compacted again at optionally a higher pressure, temperature and/or longer duration (block 410). In some exemplary embodiments, the final compaction of the whole green body is performed at a pressure of between 150-300 MPa, in aluminum case e.g. 250 MPa or a temperature below 430° C. Optionally, the layers are compacted for an extended duration of time, e.g.

2-6 minutes. Typically, the compaction is die compaction so that only the Z-axis is compacted during the process. After compaction, sintering is typically applied (block 415). In some exemplary embodiments, sintering is applied in a plurality of stages. Optionally at a first stage, the built layers are heated at relatively low temperature, e.g. below 400° C. over a first duration, e.g. 20-180 minutes. In case of the use of aluminum powder and some other metals like stainless steel, this step may require an inert environment of Nitrogen. In some embodiments, the mask pattern is burned at this stage, mainly due to the oxygen contained in the polymer. At a second stage the temperature may be raised, e.g. 450° C. and this temperature may be maintained for a second duration, e.g. 0-30 minutes. Rising and cooling may be at defined rate, e.g. 10° C./min. At a third stage, the temperature may be raised again, e.g. 570-630° C. (in case of aluminum powder, depending on the alloy in use) and this temperature may be maintained for a third duration, e.g. 60-120 minutes. In case of aluminum powder—all these steps may be processed in an inert environment. After sintering and cooling, the object may be extracted from the block of layers. Other post processing steps (i.e. steps performed after the building of the green compact) may be necessary to improve the density of the printed objet.

An aspect of some exemplary embodiments of the present invention provides for a system for building a three dimensional object comprising: a digital printing station configured to print a mask on a building surface, wherein the mask is formed from at least one of photopolymer material and wax material that is configured to burn during sintering; a powder delivery station configured to apply a layer of powder material on the mask pattern; a process compaction station for compacting per layer of powder material, wherein the compaction station includes a die for receiving the layer; a stage configured to repeatedly advancing the building tray to each of the digital printing station, the powder delivery station and the process compaction station to build a plurality of layers that together form the three dimensional object; and a sintering station configured to sinter the plurality of layers.

Optionally, the process compacting station includes a heating element for warming a surface of the die that interfaces with the layer.

Optionally, the process compacting station is operable to apply up to 300 MPa of pressure on the layer.

Optionally, the process compacting station includes side walls that are configured to be introduced around the building tray based on contact of the layer with the compacting station. The side walls are locked in place such that they have minimal movement, e.g. less than 0.1 mm under the reaction forces developed in the powder block while compacting.

Optionally, wherein the process compacting station includes an anti-peeling mechanism, the anti-peeling mechanism including a foil positioned between the die.

Optionally, the system includes a milling or grinding station, wherein the milling or grinding station is configured to remove a surface of the layer after compaction, wherein the stage is configured to repeatedly advance the building tray to each of the digital printing station, the powder delivery station, the process compaction station and the milling or grinding station to build a plurality of layers that together form the three dimensional object.

Optionally, the milling or grinding station is configured to shave off 10-40% of the layer thickness.

Optionally, the system includes a final compaction station configured to compact the plurality of layers.

Optionally, the final compaction station heat compacts the plurality of layers over a plurality of heating stages.

Optionally, the powder delivery station includes a motorized roller that is configured to move across the layer for spreading the powder.

Optionally, the powder delivery station includes a gutter for receiving excess powder based on the roller moving across the layer for spreading the powder.

Optionally, the powder delivery station is configured to recycle the excess powder.

An aspect of some exemplary embodiments of the present invention provides for a method for building a three dimensional object comprising: printing a mask on a building surface, wherein the mask is formed from at least one of a photopolymer material and wax that is configured to burn during sintering; spreading a layer of powder on the mask pattern; compacting the layer of powder; repeating the printing, spreading and compacting until layers of the three dimensional object is completed; and sintering the layers of the three dimensional object.

Optionally, the method includes applying heat during the compacting.

Optionally, the compacting is die compaction.

Optionally, the mask includes a contour of the object per layer.

Optionally, the mask additionally includes a pattern that extends from the contour of the object per layer toward edges of a footprint of the layer.

Optionally, the method includes milling or grinding the layer after compaction and before printing an additional mask on the layer.

Optionally, 10-40% of the layer thickness is removed based on the milling or grinding.

Optionally, the printing, spreading and compacting are performed in ambient temperatures.

Optionally, the method includes performing a final heat compaction prior to sintering, wherein the final heat compaction is performed over a plurality of heating stages.

Optionally, the method includes burning at least one of the photopolymer material and the wax during the sintering.

Figure 13:
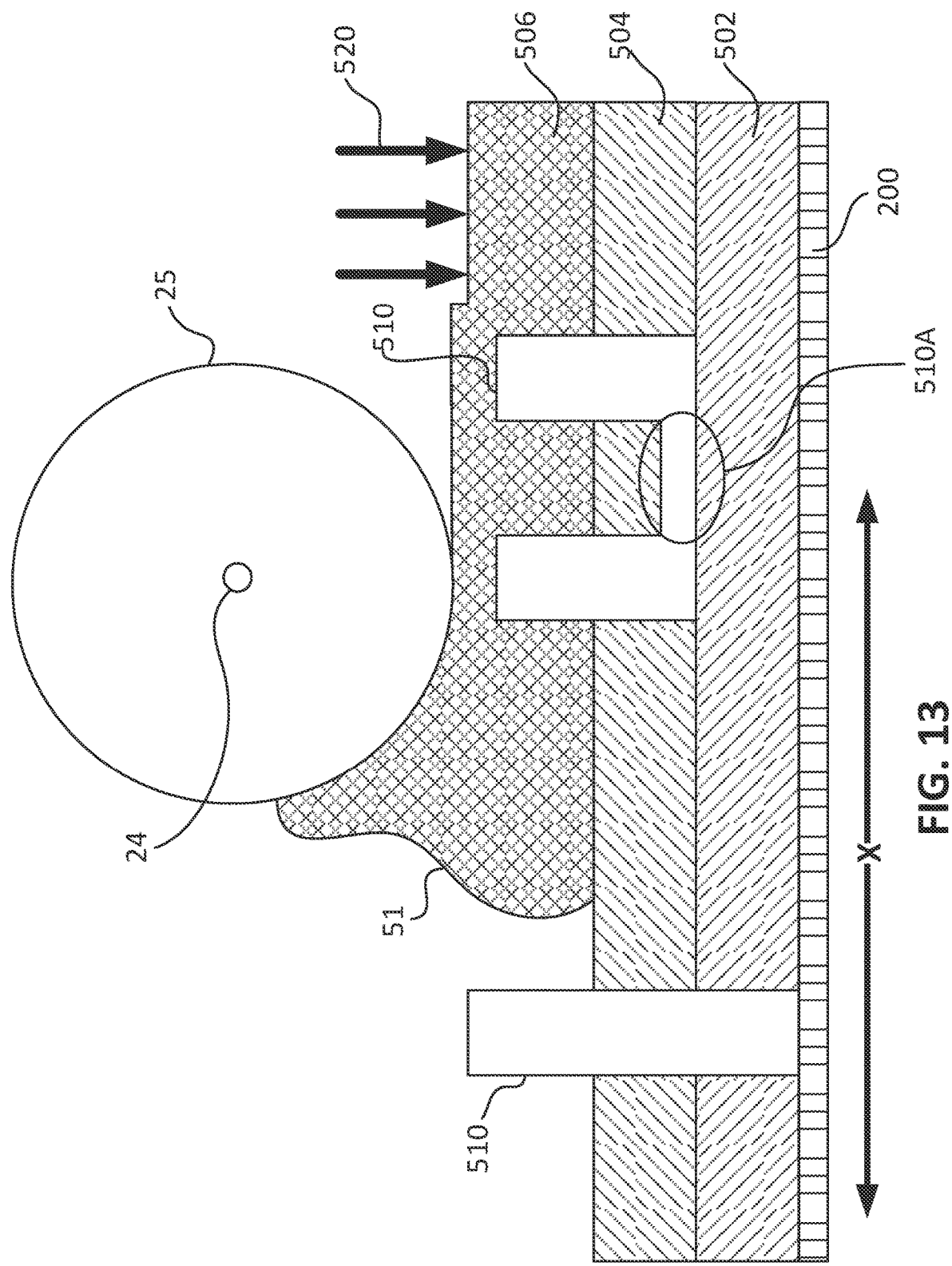
FIG. 13 is a simplified schematic drawing of an example per layer building process in accordance with some embodiments of the present invention.

Reference is now made to FIG. 13 showing a simplified schematic drawing of another exemplary per layer building process in accordance with some embodiments of the present invention. FIG. 13 shows an example third layer 506 in the process of being built over an example first layer 502 and second layer 504. In some exemplary embodiments, a mask pattern 510 is dispensed per layer with a three dimensional printer. According to some exemplary embodiments, mask pattern 510 is formed from a solidifiable material such as phase-change ink. Mask pattern 510 may physically contact a mask pattern 510 in a previous layer, e.g. layer 504 or may be patterned over an area of the previous layer including the building material. A height of mask pattern 510 per layer may be substantially the same as a height of the layer or may optionally be shorter than a height of the layer, e.g. portion 510A of mask pattern 510 in layer 504. Optionally, milling is not required.

According to some examples, powder 51 is spread over the mask pattern 510 and across a footprint of a building tray 200. In some example embodiments, powder 51 is spread with a roller 25. Optionally, roller 25 is actuated to both rotate about its axle 24 and to move across building tray 200 along an X axis. Once powder 51 is spread across the footprint of tray 200, compaction 520 may be applied on the entire layer to compact layer 506. Typically, a height of layer 506 is reduced due to process compaction.

Figure 14:
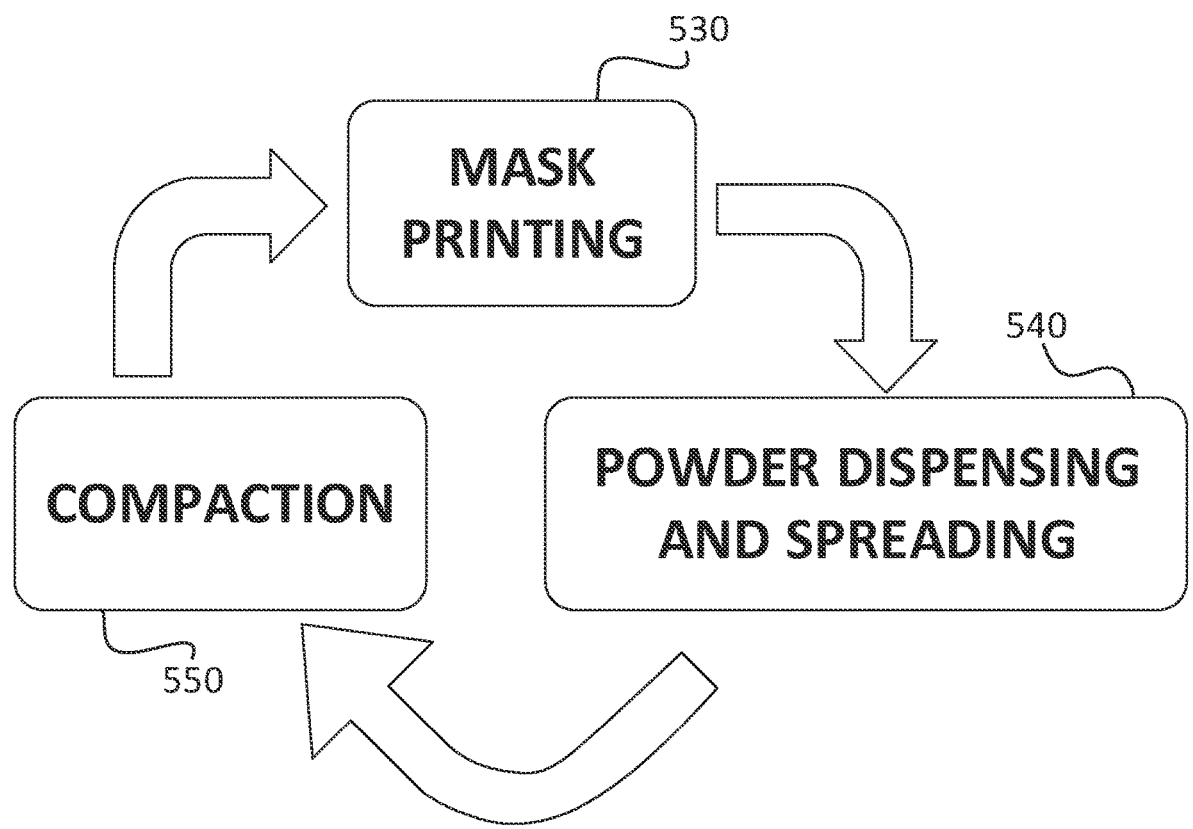
FIG. 14 is a simplified block diagram of an example building process in accordance with some embodiments of the present invention.
Figure 15:
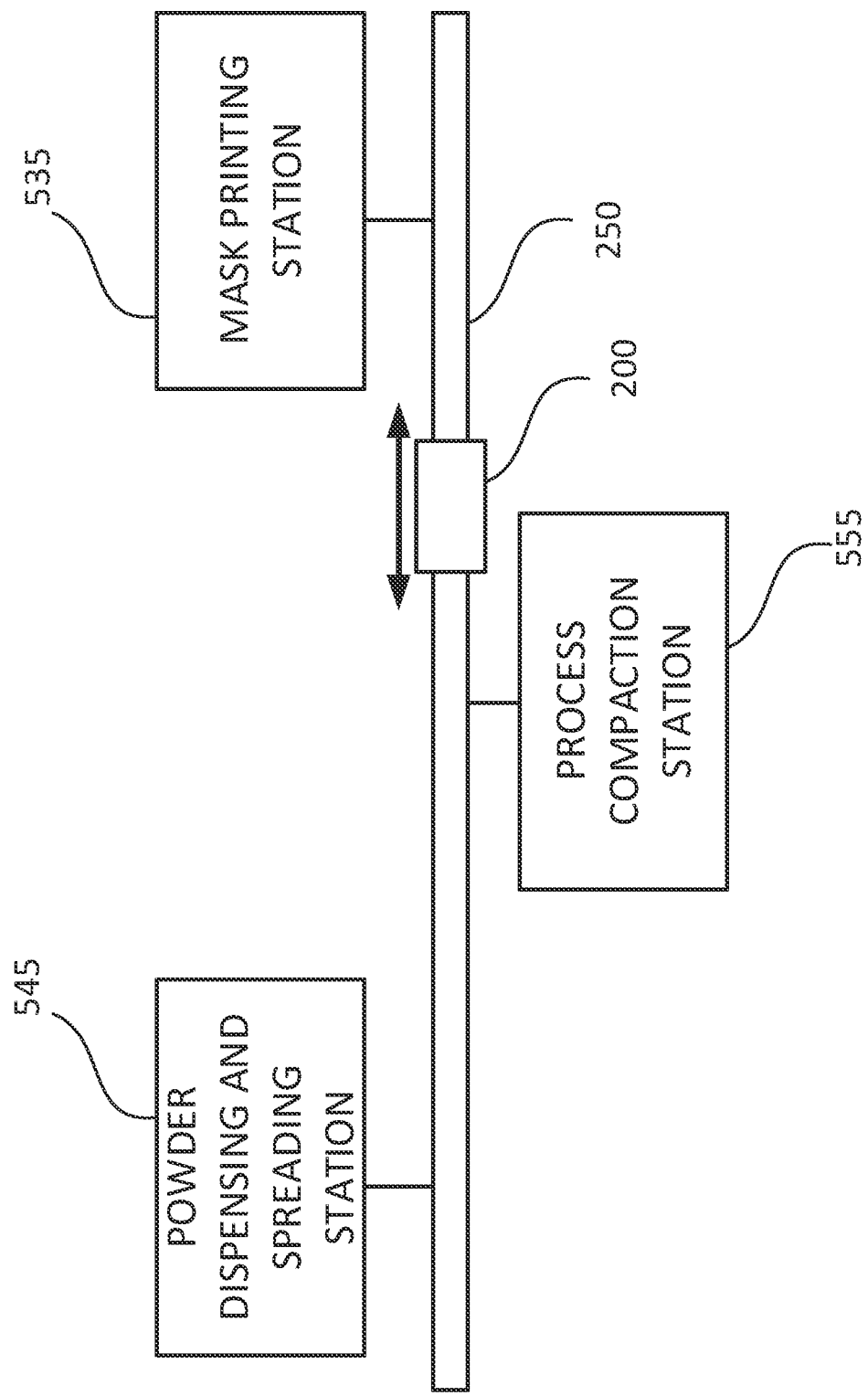
FIG. 15 is an image of an example printing system in accordance with some embodiments of the present invention.

Reference is now made to FIG. 14 showing a simplified block diagram of an exemplary building process and to FIG. 15 showing a simplified schematic drawing of an exemplary 3D printing system in accordance with some embodiments of the present invention. According to some exemplary embodiments, an object (i.e. a green body) may be constructed layer by layer within a green compact in a cyclic process. Each cycle of the cyclic process may include the steps of printing a mask pattern (block 530) at a printing station 535, dispensing and spreading a powder material (block 540) over the mask at a dispensing and spreading station 545 (also referred to as "powder delivery station") and compacting the powder layer including the mask pattern (block 550) at a compacting station 555. In some exemplary embodiments, the mask pattern is formed from a solidifiable material such as phase-change ink. In some exemplary embodiments, the compaction is performed as described in reference to FIGS. 7A and 7B. According to embodiments of the present in invention, each cycle builds one layer of the green compact and the cycle is repeated until all the layers have been built. Optionally, one or more layers may not require a mask pattern and the step of printing the mask pattern (block 530) may be excluded from selected layers. Optionally, one or more layers may not require powder material and the step of dispensing and spreading a powder material (block 540) may be excluded from selected layers.

According to embodiments of the present invention, this cyclic process yields a green compact or green block. The green compact may include one or more objects (i.e. green bodies) surrounded by mask and building material forming support regions outside of the object. According to embodiments of the present invention, both the object(s) and the surrounding support regions including the mask make up a green compact formed with the powder material that was dispensed and spread during the cyclic process. According to embodiments of the present invention, the mask pattern that was printed defines a boundary around the object(s) and optionally regions within the block that enables extracting the object(s) from the surrounding material. According to some example embodiments, the object(s) once extracted from the surrounding material may be further post processed, e.g. may be further compacted over one or more steps prior to sintering.

Figure 16:
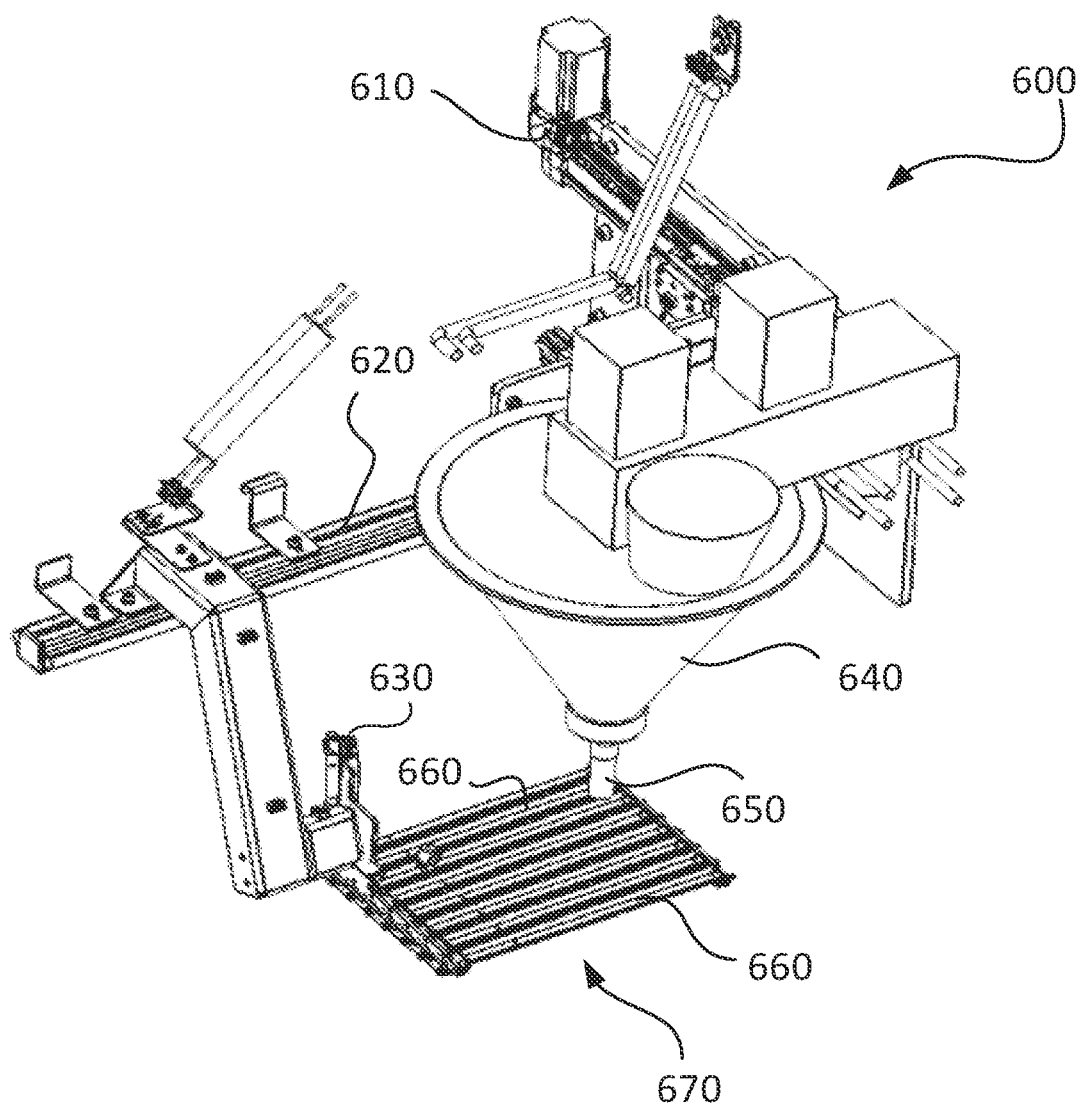
FIG. 16 is an example drawing of a powder dispenser in accordance with some embodiments of the present invention.

Reference is now made to FIG. 16 showing an example drawing of a powder dispenser in accordance with some embodiments of the present invention. According to some exemplary embodiments, a powder dispenser 600 dispenses a plurality of rows of powder material per layer. In some example embodiments, the rows of powder dispensed by powder dispenser 600 are spread off-line on a dedicated spreading tray 670 including a plurality of troughs 660 in which powder 51 is received. In some example embodiments, powder dispenser 600 includes a first rail 610 that advances the troughs below the hopper 640 so that the hopper may dispense powder into each of the plurality of troughs 660 of the powder dispensing tray in turn, and a second rail 620 that moves the powder dispensing tray below the hopper such that the hopper 640 dispenses powder 51 through a dispensing tip 650 along each of the plurality of troughs 660 until all the troughs have been filled. Typically, movement along each of first rail 610 and second rail 620 is actuated with a dedicated motor. In some example embodiments, powder hopper 640 includes an auger for precise powder dosing per row, e.g. per trough 660. Typically, the auger is controllably rotated with a dedicated motor. Optionally, the auger is actuated while second rail 620 moves the powder dispensing tray under powder hopper 640 as it dispenses powder 51 along each of the plurality of troughs 660 and is not actuated while first rail 610 moves the powder dispensing tray such that powder hopper 640 is above each of the plurality of troughs 660 in turn.

According to some exemplary embodiments, powder dispenser 600 includes a piston 630 that actuates transferring the rows of powder material from spreading tray 670 to the building tray 200 (FIG. 15) once all the rows have been prepared. In some example embodiments, piston 630 is configured to simultaneously flip each of the troughs 660 of spreading tray 670 onto building tray 200. In other example embodiments, each of the troughs 660 includes a longitudinal aperture along the base of the trough that is covered or closed and piston 630 is configured to actuate simultaneously opening the longitudinal apertures to dispense rows of powder material onto building tray 200.

According to some example embodiments, the rows are positioned on the building tray so that they are parallel with a roller 25 (FIG. 13), e.g. parallel with axle 24 of rotation of roller 25 and perpendicular to linear movement of roller 25 across the building tray, e.g. perpendicular to the X axis (FIG. 13). Optionally, 2-20 rows of powder are spread on spreading tray 670 per layer. According to some exemplary embodiments, roller 25 spreads the rows of powder 51 across building tray 200.

Figure 17:
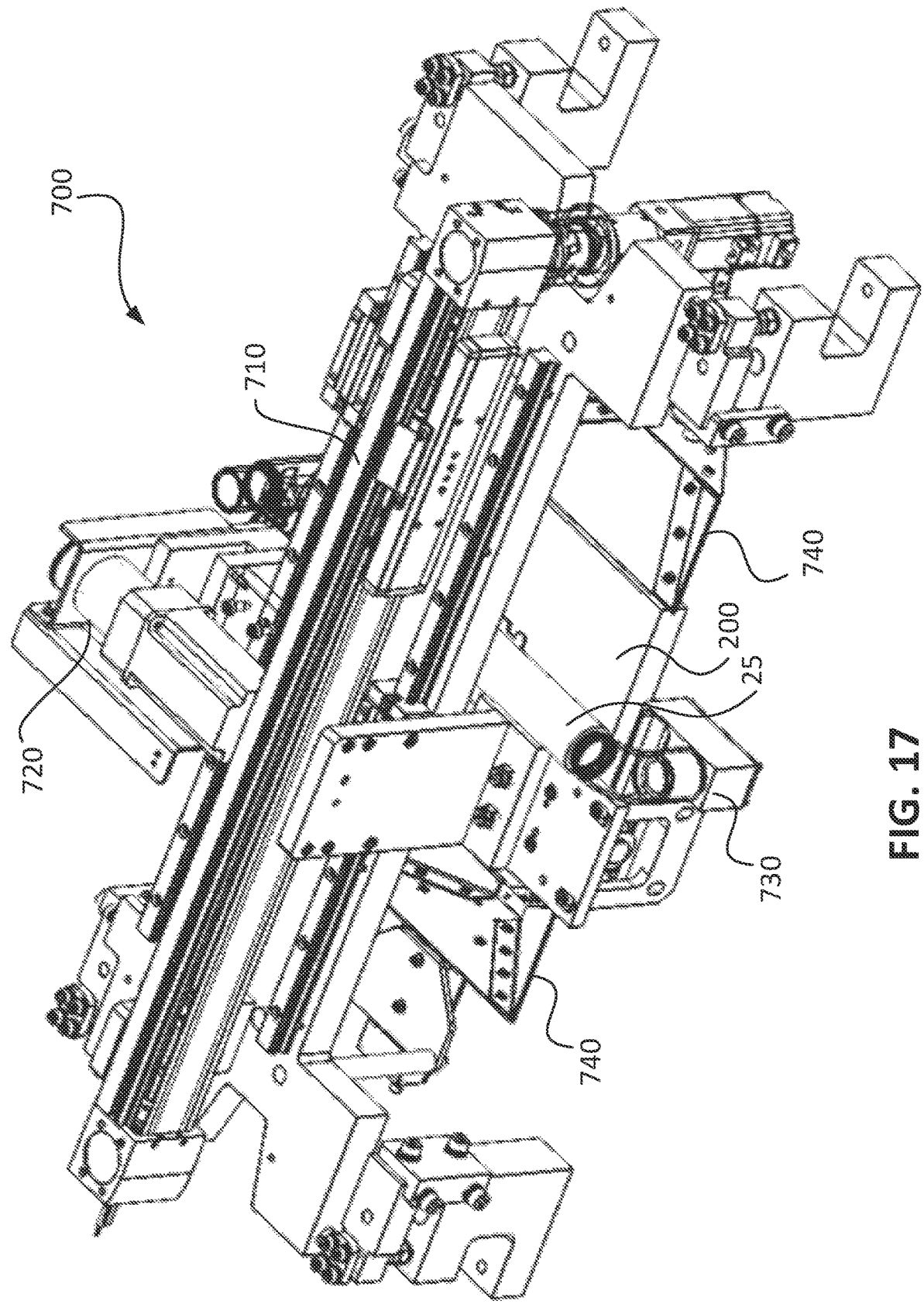
FIG. 17 is an example drawing of a roller, building tray and surrounding gutters in accordance with some embodiments of the present invention.

Reference is now made to FIG. 17 showing an exemplary spreading unit in accordance with some embodiments of the present invention. According to some exemplary embodiments, a spreading unit 700 includes a roller 25, a pair of side gutters 730 and a pair of end gutters 740. Side gutters 730 and end gutters 740 are configured to collect excess powder 51 on building tray 200 as roller 25 is rolled across building tray 200. According to some exemplary embodiments, roller 25 is actuated to move along a rail 710 across building tray 200 along the X axis (FIG. 13) and is also actuated with a motor 720 to rotate about its axle 24. Typically, motor 720 travels on rail 710 and rotates roller 25 as it moves across building tray 200 along a direction of the X axis. Roller 25 may be actuated to move forward, backwards along a direction of the X axis or both forward and backwards along a direction of the X axis. Optionally, spreading unit 700 alternates between moving roller 25 in a forward and backward direction. Typically, a direction of rotation of roller 25 about its axle 24 is adapted to the linear direction of movement of roller 25.

According to some exemplary embodiments, each of side gutters 730 is positioned below each end of roller 25 and the pair of side gutters 730 move together with roller 25 along rail 710. Side gutters are configured to collect excess powder 51 that falls off of building tray 200 as roller 25 spreads powder 51. In some example embodiments, a length of side gutter 730 along a direction of rail 710 (in a direction of the X axis) is at least twice a diameter of the roller 25.

According to some exemplary embodiments, each of end gutters 740 is located near an edge of building tray 200 that is parallel to roller 25 and perpendicular to rail 710 and extends at least along the entire edge of building tray 200 to collect excess powder that falls off building tray 200 as roller 25 spreads powder 51. In some example embodiments, end gutters 740 are positioned at the level at which roller 25 touches building tray 200 or building surface, e.g. top of uppermost layer. End gutters 740 move together with roller 25 along rail 710 but are also separately actuated to move toward and away from building tray 200 as needed. Optionally, movement of end gutters 740 toward and away from the building tray 200 is in the order of magnitude of 1 mm to 1 cm. In some example embodiments, end gutters are configured to move toward building tray 200 to collect the excess powder and to move away from the building tray during movement of the building tray, e.g. vertical or lateral movement of building tray 200.

According to some example embodiments, a vacuum (creating an air suction) is applied to remove the powder accumulated in each of the side gutters 730 and end gutters 740 as the roller spreads powder 51 across building tray 200. Optionally, the vacuum is alternately applied to side gutters 730 and end gutters 740 based on position of roller 25. Optionally, the vacuum is alternately applied to each of the pair of end gutters 740 based on position of roller 25. In some exemplary embodiments, between 50%-80% of powder 51 that is dispensed per layer on building tray 200 is collected in side gutters 730 and end gutters 740. The collected powder may be transferred to a recirculation system that reintroduces the collected powder to powder hopper 640.

Figure 18:
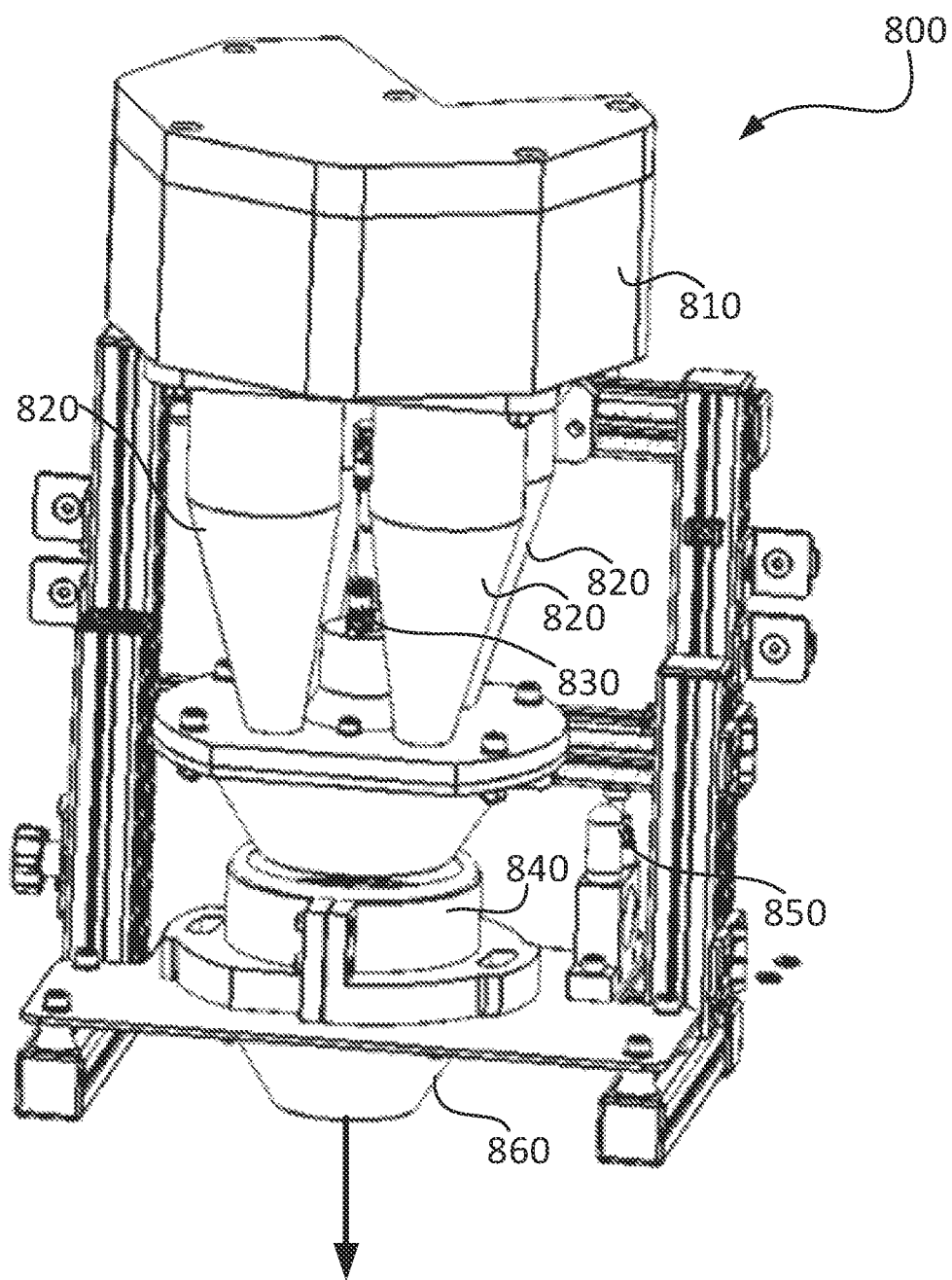
FIG. 18 is an example drawing of a powder recirculation system in accordance with some embodiments of the present invention.

Reference is now made to FIG. 18 showing an example drawing of a powder recirculation system in accordance with some embodiments of the present invention. According to some example embodiments, a powder recirculation system 800 includes a container 810 that is configured to receive powder collected from side gutters 730 and end gutters 740 of spreading unit 700, one or more cyclone separators 820 configured to remove air from powder in container 810, a mesh 840 to separate debris from the powder separated by cyclone separators 820 and a spout 860 through which the powder is dispensed into powder hopper 640. In some exemplary embodiments, cyclone separators 820 are operated in series. Optionally, the series facilitates collecting powder particles with different sizes and weights at a high efficiency by varying the filtering conditions (e.g. air flow speed, cyclone diameter) from one cyclone separator 820 to another. For example, contents in container 810 may first be introduced into one of cyclone separators 820. Air removed from the first cyclone separator may be introduced into a second one of cyclone separators 820. Optionally, the air removed from the first cyclone separator may still contain powder material and that material may be separated in the second cyclone separator. This process may be continued for all the cyclone separators. Typically, powder is substantially continuously introduced into container 810 during the spreading process and substantially continuously streamed from one cyclone separators to the next so that all the cyclone separators are operated simultaneously. Optionally, powder recirculation system 800 includes four cyclone separators.

According to some example embodiments, the cyclone separators include caps configured to seal an outlet during operation of the cyclone separator. In some example embodiments, the cap is periodically released to collect the powder from cyclone separators 820. Typically, the cap is released between periods of operation of spreading unit 700. Optionally, a piston 830 controls a simultaneous release of all the caps. In some example embodiments, powder collected from cyclone separators 820 is filtered through mesh 840 to separate it from any debris or clumped powder that may have been collected. Optionally, a piston 850 actuates vibration of mesh 840 to facilitate the filtering. The powder filtered through the mesh may then be introduced into the hopper and mixed into the powder in the hopper 640.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for three dimensional printing with powder layers, the system comprising:
   a printing station configured to print a mask pattern on a building tray,
   a powder delivery station comprising a powder hopper configured to store powder material, and configured to apply a layer of powder material on the mask pattern,
   a spreading unit comprising a roller configured to spread the layer of powder material,
   a plurality of gutters which comprises a first pair of gutters actuated to move together with the roller during the spreading of the powder material and which is configured to collect excess powder material falling from edges of the building tray during spreading,
   a powder recirculation system configured to recirculate the excess powder material to the powder hopper, and
   a die compaction station for compacting the layer of powder material and the mask pattern.

2. The system according to claim 1, wherein the plurality of gutters includes a second pair of gutters positioned at a front end and back end of the building tray with respect to a direction of movement of the roller across the building tray.

3. The system according to claim 2, wherein the second pair of gutters is actuated to move towards and away from the building tray.

4. The system according to claim 1 comprising an air suction configured to suction the powder material accumulated in the plurality of gutters.

5. The system according to claim 4, wherein the plurality of gutters also comprises a second pair of gutters, and wherein the air suction is configured to alternate between suctioning the powder material from the first pair of gutters and the second pair of gutters.

6. The system according to claim 4, wherein the plurality of gutters includes a second pair of gutters positioned at a front end and back end of the building tray with respect to a direction of movement of the roller across the building tray and wherein the air suction is applied to the second pair of gutters when the air suction applied in the first pair of gutters is switched off.

7. The system according to claim 1, wherein the powder delivery station further comprises at least one cyclone separator configured to remove air from the powder material collected from the plurality of gutters.

8. The system according to claim 7, wherein the powder delivery station includes a plurality of cyclone separators operated in series.

9. The system according to claim 7, wherein the at least one cyclone separator includes a cap configured to seal an outlet during operation of the cyclone separator.

10. The system according to claim 1, wherein the powder delivery station includes a mesh configured to separate the powder material from debris prior to delivering the powder material to the powder hopper.

11. The system according to claim 10 further comprising a vibrator configured to actuate vibrations on the mesh and facilitate filtering of the powder through the mesh.

12. A method for three dimensional printing with powder layers, comprising:
    printing a mask pattern on a building surface;
    dispensing a layer of powder material on the mask pattern, by a spreading unit which comprises a roller, spreading the layer of powder material on the mask pattern;
    by a plurality of gutters which comprises a first pair of gutters actuated to move together with the roller during the spreading of the powder material, collecting excess powder material falling from the edges of the building surface during the spreading;
    recirculating the excess powder material to a powder hopper including a supply of powder; and
    compacting the layer.

13. The method according to claim 12, further comprising suctioning the excess powder to at least one cyclone separator and separating the powder from air in the at least one cyclone separator.

14. The method according to claim 13, further comprising streaming the excess powder through a plurality of cyclone separators in series, wherein the streaming is continuous and wherein the plurality of cyclone separators are operated simultaneously.

15. The method according to claim 13, wherein the suctioning is actuated during the spreading of the powder material.

16. The method according to claim 13, further comprising filtering the powder material from the at least one cyclone separator with a mesh and delivering powder material filtered through the mesh to the powder hopper.

17. The method of claim 16, wherein the filtering is actuated with a vibrator.

18. The method according to claim 12, wherein the recirculated powder is actively mixed into the powder supply in the hopper.

19. The method according to claim 12, wherein the collecting and the recirculating is performed during the printing.

20. The system according to claim 7, wherein said series operation of said plurality of cyclone separators is such that air removed from one cyclone separator in said series is introduced into a next cyclone separator in said series, and wherein each cyclone separator is configured to collect powder particles with a different size.

* * * * *